United States Patent
Clarke et al.

(10) Patent No.: US 12,209,397 B2
(45) Date of Patent: Jan. 28, 2025

(54) SYSTEMS AND METHODS FOR WATER RE-USE

(71) Applicant: The Procter & Gamble Company, Cincinnati, OH (US)

(72) Inventors: Colin John Clarke, West Ashford, OH (US); Frantz Beznik, Cincinnati, OH (US); Anna L. Connolly, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 517 days.

(21) Appl. No.: 17/527,240

(22) Filed: Nov. 16, 2021

(65) Prior Publication Data

US 2022/0162836 A1 May 26, 2022

Related U.S. Application Data

(60) Provisional application No. 63/118,176, filed on Nov. 25, 2020.

(51) Int. Cl.
*E03B 1/04* (2006.01)
*C02F 1/00* (2023.01)
(Continued)

(52) U.S. Cl.
CPC .............. *E03B 1/044* (2013.01); *E03B 11/02* (2013.01); *C02F 1/008* (2013.01);
(Continued)

(58) Field of Classification Search
CPC . E03B 1/044; E03B 11/02; E03B 5/02; E03B 2001/045; C02F 1/008;
(Continued)

(56) References Cited

U.S. PATENT DOCUMENTS

| 5,307,650 A | 5/1994 | Mertz |
| 6,139,729 A * | 10/2000 | Gonzalez, Jr. ............ E03B 1/04 |
| | | 210/170.08 |

(Continued)

FOREIGN PATENT DOCUMENTS

| CN | 202089861 U * | 12/2011 | .............. C02F 3/006 |
| EP | 3369708 A1 * | 9/2018 | .............. C02F 1/008 |

(Continued)

OTHER PUBLICATIONS

Machine-generated English translation of CN 202089861, generated on Jun. 20, 2024.*

(Continued)

*Primary Examiner* — Fred Prince
(74) *Attorney, Agent, or Firm* — William E. Gallagher

(57) ABSTRACT

A water use management system may be installed in a setting that contains a primary infrastructure for water use to provide an alternate, modular infrastructure for water use. Fresh water used at various points of use, such as a shower or sink, may be diverted into the modular infrastructure prior to draining into the primary infrastructure. Once diverted, the precedent use water is received at a reservoir system where it is treated for a subsequent use. Treatment may include filtration and/or chemical treatment, and may be based upon sensor feedback from the reservoir system. Once treated, the water is ready for subsequent use and may flow from the reservoir system, via the modular infrastructure, to a subsequent point of use, such as a toilet.

9 Claims, 8 Drawing Sheets

(51) Int. Cl.
*E03B 5/02* (2006.01)
*E03B 11/02* (2006.01)
*C02F 103/00* (2006.01)

(52) U.S. Cl.
CPC .. *C02F 2103/002* (2013.01); *C02F 2209/001* (2013.01); *C02F 2209/006* (2013.01); *C02F 2209/008* (2013.01); *E03B 2001/045* (2013.01); *E03B 5/02* (2013.01); *E03C 2201/40* (2013.01)

(58) Field of Classification Search
CPC .......... C02F 2103/002; C02F 2209/001; C02F 2209/006; C02F 2209/008; E03C 2201/40
USPC ................ 210/739, 740, 742, 743, 745, 746
See application file for complete search history.

(56) References Cited

U.S. PATENT DOCUMENTS

| | | | |
|---|---|---|---|
| 2009/0014383 A1* | 1/2009 | Owley | C02F 3/04 210/151 |
| 2011/0067769 A1 | 3/2011 | Stimpson | |
| 2012/0261352 A1 | 10/2012 | Kawasaki | |
| 2013/0015137 A1* | 1/2013 | Urmenyi | B01D 37/048 210/744 |
| 2015/0069088 A1 | 3/2015 | Olson | |
| 2015/0344323 A1* | 12/2015 | Mahdjoubi Namin | A47K 3/281 210/86 |
| 2015/0368840 A1 | 12/2015 | Pollett | |
| 2016/0016836 A1* | 1/2016 | Sudnick | C02F 9/00 210/104 |
| 2018/0312419 A1 | 11/2018 | Huang et al. | |
| 2018/0345532 A1 | 12/2018 | Randall | |
| 2018/0354432 A1 | 12/2018 | Van Beek | |
| 2019/0368167 A1 | 12/2019 | Ridell | |
| 2020/0248351 A1 | 8/2020 | Monsrud et al. | |
| 2020/0256041 A1* | 8/2020 | Kitagawa | G06Q 10/06 |
| 2022/0193334 A1 | 6/2022 | Schabbach | |

FOREIGN PATENT DOCUMENTS

| | | |
|---|---|---|
| WO | 9405866 A1 | 3/1994 |
| WO | 2007001488 A1 | 1/2007 |
| WO | 2015134887 A1 | 9/2015 |
| WO | 2018081709 A1 | 5/2018 |
| WO | 2018097788 A1 | 5/2018 |

OTHER PUBLICATIONS

Machine-generated English translation of EP 3369708, generated on Jun. 20, 2024.*
PCT Search Report and Written Opinion for PCT/US2021/072416 dated Apr. 25, 2022, 21 pages.
All Office Actions; U.S. Appl. No. 17/692,276, filed Mar. 11, 2022.
All Office Actions; U.S. Appl. No. 17/692,282, filed Mar. 11, 2022.
All Office Actions; U.S. Appl. No. 17/692,286, filed Mar. 11, 2022.
All Office Actions; U.S. Appl. No. 17/692,274, filed Mar. 11, 2022.
Unpublished U.S. Appl. No. 17/692,274, filed Mar. 11, 2022, Anna L. Connolly et al.
Unpublished U.S. Appl. No. 17/692,276, filed Mar. 11, 2022, Anna L. Connolly et al.
Unpublished U.S. Appl. No. 17/692,286, filed Mar. 11, 2022, Colin John Clarke et al.
Unpublished U.S. Appl. No. 17/692,282, filed Mar. 11, 2022, Colin John Clarke et al.

* cited by examiner

SYSTEMS AND METHODS FOR WATER RE-USE

FIELD OF THE INVENTION

The present disclosure relates to systems and methods for managing domestic storage, treatment, and use of water.

BACKGROUND OF THE INVENTION

Water scarcity is becoming an increasing problem for many countries, with the scale of the impact affected by multiple factors such as population growth, climate change and the increasing demands of both industry and agriculture. Thus, the demand for water is likely to become further strained in the decades ahead, and indeed many global cities face supply vs demand shortages than cannot be met by today's strategies. One approach to ensuring residential homes have sufficient resources to meet these scarcity challenges is the principle of re-use, in that certain water streams within the home are re-used or re-purposed for a secondary use, sometimes characterized as "greywater." Conventional approaches to such re-use focus on a "whole home" approach, and require significant initial costs (e.g., installation of hardware and infrastructure, reconfiguration of supply lines and drains, etc.) and maintenance costs (e.g., treatment, cleaning, especially around water waste classified as "sewage"). The resulting system may treat and divert multiple residential streams of water back to a single stream potable, or non-potable quality form for secondary re-use application (e.g., substantially all water used in the home is diverted to a single reservoir which feeds all future use). However, this potable or non-potable form is not optimized for any particular use and does not take into account the specific needs of the secondary purpose, and so in some cases the treatment of input water may be inefficient, unnecessary, or unsuitable based on the water's previous use and actual characteristics. Due to the high cost of implementation and maintenance, as well as the static, rather than dynamic or reactive, treatment of water, the scale of the savings realized by residential homes using conventional graywater systems is limited, and so they are not considered to be a feasible or realistic option for the majority of domestic users.

SUMMARY OF THE INVENTION

In one form, a method comprises capturing, by a water capture device, a precedent use water prior to disposal at a precedent point of use. The method further comprises transporting, by the water capture device, the precedent use water to a reservoir system. The method further comprises receiving, by a processor, a set of data describing the precedent use water. The method further comprises determining, by the processor, a set of characteristics of the precedent use water based on the set of data. The method further comprises identifying, by the processor, a modification to the set of characteristics based on a configured set of desirable characteristics. The method further comprises providing, by a treatment module, a chemical treatment configured to cause the modification to the set of characteristics and convert the precedent use water to subsequent use water. The method further comprises providing, by the reservoir system, the subsequent use water to a subsequent point of use.

In another form, a method for managing water use using a modular infrastructure, wherein the modular infrastructure is isolated from a primary infrastructure that includes a fresh water input and a waste water output, comprises capturing, by a water capture device, a precedent use water prior to entering the primary infrastructure at a precedent point of use. The method further comprises selectively transporting, by the water capture device and via the modular infrastructure, the precedent use water to a reservoir system based on a fill status of the reservoir system. The method further comprises providing, by a treatment module, a chemical treatment configured to cause a modification to the precedent use water and convert the precedent use water to subsequent use water. The method further comprises providing, by the reservoir system and via the modular infrastructure, the subsequent use water to a subsequent point of use.

In another form, a system comprises a water capture device operable to capture and transport a precedent use water from a precedent point of use prior to disposal at the precedent point of use. The system further comprises a reservoir system configured to receive and store the precedent use water. The system further comprises a treatment module operable to chemically treat the precedent use water in the reservoir system. The system further comprises a processor; wherein the processor is configured to receive a set of data describing the precedent use water. The processor is further configured to determine a set of characteristics of the precedent use water based on the set of data. The processor is further configured to identify a modification to the set of characteristics based on a configured set of desirable characteristics. The processor is further configured to operate the treatment module to provide a chemical treatment configured to cause the modification to the set of characteristics and convert the precedent use water to subsequent use water. The processor is further configured to cause the reservoir system to provide the subsequent use water to a subsequent point of use.

BRIEF DESCRIPTION OF THE DRAWINGS

The above-mentioned and other features and advantages of the present disclosure, and the manner of attaining them, will become more apparent and the disclosure itself will be better understood by reference to the following description of non-limiting embodiments of the disclosure taken in conjunction with the accompanying drawings, wherein.

DETAILED DESCRIPTION OF THE INVENTION

The present disclosure relates to systems and methods for managing the storage, treatment, and use of water in domestic environments. Various nonlimiting embodiments of the present disclosure will now be described to provide an overall understanding of the principles of the function, design and operation of the systems and methods. One or more examples of these nonlimiting embodiments are illustrated in the accompanying drawings. Those of ordinary skill in the art will understand that the systems and methods described herein and illustrated in the accompanying drawings are nonlimiting example embodiments and that the scope of the various nonlimiting embodiments of the present disclosure are defined solely by the claims. The features illustrated or described in connection with one nonlimiting embodiment may be combined with the features of other nonlimiting embodiments. Such modifications and variations are intended to be included within the scope of the present disclosure.

Figure 1:
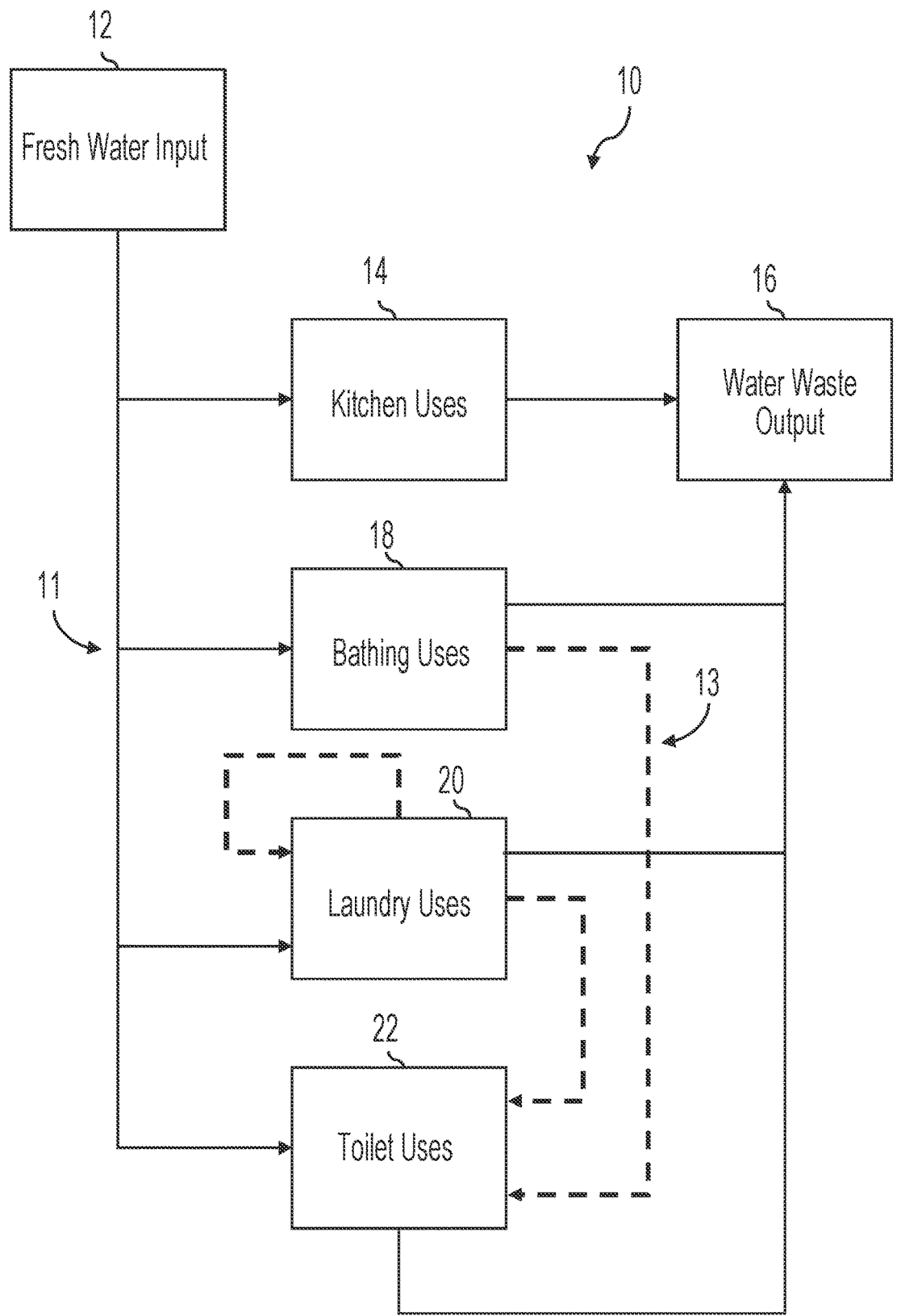
FIG. 1 is a schematic diagram illustrating exemplary water uses.

Turning now to the figures, FIG. 1 shows a schematic diagram illustrating exemplary water uses within a domestic setting 10, such as a household. Primary infrastructure 11 related to water use (e.g., copper or plastic pipes providing fresh water, plastic drain pipes that divert used water to a sewage system) is illustrated as solid lines, while modular infrastructure 13 related to the disclosed systems and methods is illustrated as dashed lines. Fresh water enters the domestic setting 10 via the primary infrastructure 11 from a fresh water input 12, which may be, for example, a water treatment plant or other public utility, a public water storage reservoir, a fresh water well, or another water table access point. Water provided by the fresh water input 12 is used in a variety of ways within the domestic setting, such as kitchen uses 14 (e.g., sink, dishwasher), bathing uses 18 (e.g., shower, sink), laundry uses 20 (e.g., washing machine), and toilet uses 22. In addition to providing water for various uses, the primary infrastructure 11 also provides drainage from those uses to a water waste output 16, such as a public sewage system, cesspool, or septic system.

As can be seen, the modular infrastructure 13 is more limited in the scope than the primary infrastructure 11. The modular infrastructure 13 may be encased within the structure of the domestic setting 10 (e.g., encased within walls, floors, or ceilings), or may be installed externally to such structures. The modular infrastructure 13 may include some aspects of the primary infrastructure 11, such as copper or plastic piping encased within structures, but may also include flexible tubing, flat tubing, temporary tubing with quick attach and release features, and other materials to aid in transport of water across relatively short distances and/or within a single room or adjacent rooms. In some implementations, the modular infrastructure 13 may also include transportable mobile elements, such as canisters, cartridges, or tanks that may be carried or otherwise conveyed (e.g., such as by rolling on a set of wheels) from location to location.

While the particular layout and design of the modular infrastructure 13 will depend upon particular households and varying implementations, and may also change from to time as modular connections are added or removed, FIG. 1 shows several exemplary connections that are generally effective. For example, water that is used for bathing uses 18, generally in a bathroom, may be captured by the modular infrastructure 13, treated and stored, as will be described in more detail below, and then redirected for toilet uses 22 rather than flowing to the water waste output 16. Similarly, water that is used for laundry uses 20 may be captured by the modular infrastructure 13 and then re-used one or more times for laundry uses 20, after treatment and storage, and then redirected for toilet uses 22. Water used for toilet uses 22 is generally too difficult to treat in a manner that is both efficient and acceptable for wide use, and so may be diverted directly to water waste output 16. In other implementations, the modular infrastructure 13 may provide captured water for other subsequent uses, such as for watering plants or lawns, and may capture water from additional sources, such as dishwashers, kitchen sinks, or rain water from a roof or gutters. A significant advantage of the modular infrastructure 13 is its minimal footprint and application, as compared to conventional whole home water re-use systems. Significant gains in efficiency, ease of use, and cost of maintenance are possible by implementing the modular infrastructure 13 in a limited way, and utilizing it based upon various dynamic factors such as sensor data, usage history, user requests, and other inputs as will be described in more detail below.

Figure 2:
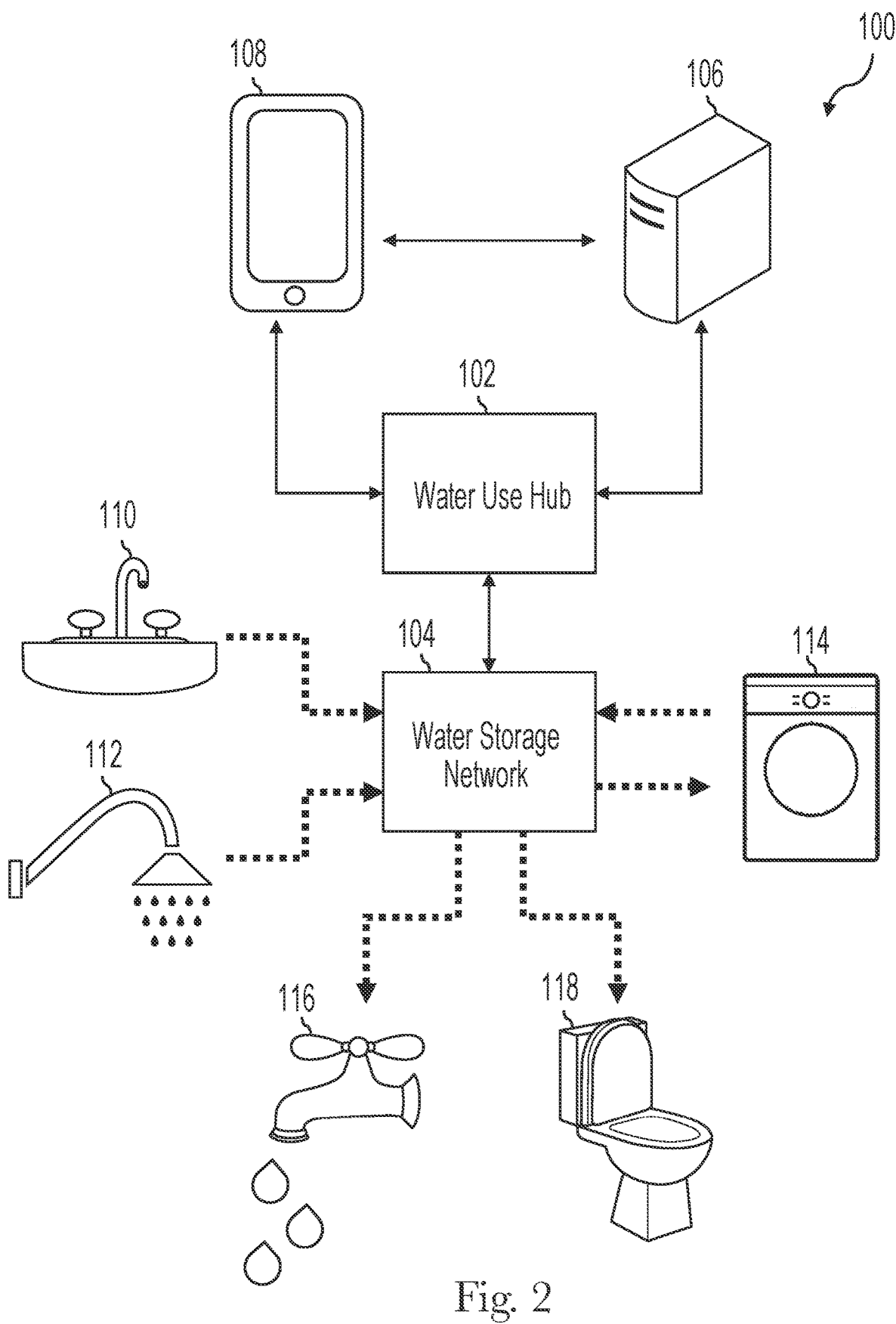
FIG. 2 is a schematic diagram illustrating an exemplary system for managing water use.

FIG. 2 is a schematic diagram illustrating an exemplary system 100 for managing water use. The system 100 may be implemented to enable some or all of the aspects of FIG. 1, such as using the modular infrastructure 13 to allow water management outside of the primary infrastructure 11. In FIG. 2, the combination of modular infrastructure 13 and storage capabilities is referred to as a water storage network 104, and may include both storage devices and infrastructure for transporting water between points of use and storage devices, as will be described in more detail below. Further, it should be understood that while the water storage network 104 is illustrated in FIG. 2 as a centralized hub through which all points of use pass, this is merely an abstraction, and many or most implementations of the system 100 will have individual modular storage devices and water supply lines that are isolated from others within the same water storage network 104.

Points of use illustrated in FIG. 2 include a sink 110 (e.g., within a bathroom, and intended primarily for handwashing and dental hygiene), a shower 112, and a toilet 118, which are typically grouped into the same room or at least proximately located to each other within the setting, as well as a washing machine 114, and an outdoor faucet 116, typically located in other rooms and at varying distances from each other and from other points of use. As with FIG. 1, the dotted lines between points of use and the water storage network 104 indicate pipes, tubes, or other manners of conveyance between a point of use and the water storage network 104, with each being outside of and not relying upon the primary infrastructure 11.

While not required in all implementations, the exemplary system 100 depicted in FIG. 2 also includes a water use hub 102, which is in communication with one or more devices of the water storage network 104, and which itself is in communication with one or more remote servers 106 and one or more user devices 108. The water use hub 102 may be a computer, a router, hub, switch, or other network device, or a proprietary device having adequate processing, storage, and communication capabilities to allow wired and/or wireless transmission and receipt of data, as well as processing, storage, and analysis of data. In some implementations, the water use hub 102 may be a smartphone or other personal computing device in the possession of a person within the setting, and so may also be a user device 108. Wired data connections may be by USB, Ethernet, broadband over power lines, or other wired connections. Wireless data connections may be Wi-Fi, Bluetooth, IR, NFC, or other short, medium, or long range wireless transmission. The remote server 106 may be one or more physical, virtual, cloud, or other server environments configured to transmit and receive data over a wide area network (e.g., the internet), and to store, modify, and analyze data. The user devices 108 may include one or more smartphones, tablets, computers, laptops, wearable devices, gaming device, proprietary devices, or other personal computing devices such as might be in the possession of a person inhabiting or visiting the location at which the system 100 is implemented.

Referring to FIGS. 1-2, data exchanged between the water use hub 102 and the water storage network 104 may include, for example, usage data indicating volumes and occurrences of water entering and exiting the network, water entering the system from the fresh water input 12, water exiting the system via the water waste output 16, and other information related to the supply, transport, use, storage, and disposal of water over the modular infrastructure 13 and, in some implementations, the primary infrastructure 11. Such information may be tracked along with times and data indicative of the location of the water at each stage of use. As a simple example, a person may take a shower 112 and a device of the water storage network 104 may detect the capture and storage of 20 gallons of water used during the shower, and diverted to a storage device instead of flowing down the drain and to the water waste output 16. The captured water may, after a period where it is treated for a subsequent use, be supplied to the toilet 118 over a series of ten or more flushes of the toilet 118. Data available to the water use hub 102 might include the day and time of the shower, as well as each flush of the toilet, and may also include data indicating the source of shower water (e.g., fresh water input 12), the source of water used in each flush (e.g., stored and treated water from the shower 112), and the status of water after each flush (e.g., disposed via the waste water output 16). In this manner, the data available from each transaction may be usable like an audit trail for water usage, with the ability to trace each gallon of fresh water input 12 as it moves through the system 100 and then eventually reaches the waste water output 16.

Data available to the water use hub 102 might also include user data that is gathered based upon historic uses or is received from a user device 108, or both. This may include, by manual configurations received via a user device 108 and/or predictive information derived from past usage, a number of persons using water within the setting, the days and times that each person is likely to take a shower, wash clothing, use an outdoor faucet, or perform some other water use, or dynamically requested particular uses (e.g., such as an indication from a user device 108 that a user is preparing to wash a car or water plans).

Data available to the water use hub 102 might also include sensor data describing characteristics of water passing through the water storage network 104. The locations, capabilities, and uses of such data will be discussed in more detail below, but as a general example storage devices and/or modular infrastructure 13 of the system 100 may include sensors capable of determining various characteristics of volumes of water. Continuing an example from above, water captured from the shower 112 may be received in a storage reservoir, and one or more sensors of the storage reservoir may determine the waters temperature, mineral content, acidity, visual clarity, or other characteristics, and may also detect the presence and type of any particles or contaminants present in the water (e.g., natural particles such as dirt, mold, or biological material, or chemical particles from soap or shampoo used while bathing). Such information might be used by storage devices to evaluate and prepare captured water for subsequent uses, and may be reported to the water use hub 102 so that it may be used for other purposes such as identifying ways to improve the overall quality of water in a household, to detect the presence of contaminants, or to suggest different products that may improve or reduce the level of chemical contaminants introduced to the water storage network 104 and/or disposed of via the waste water output 116.

Data gathered by the water use hub 102 may be provided to a remote server 106 and used as part of aggregate information on water use across a group of users or a geographical area from which it originated, for example, and may be used to produce and refine configurations of the plurality of systems 100 across many users. For example, data reported from a plurality of users within a single city may indicate that most or all residents of the city receive water with an undesirably high mineral content from the fresh water input 12. Such information may be used to remotely configure many water storage and treatment devices across a plurality of water storage networks 104 within that city, to account for and treat the known high mineral content. The water use hub 102 and/or server 106 may also use gathered data to communicate with the user device 108 and provide information, recommendations, and other data to users via a one or more graphical user interfaces. For example, the user device 108 may receive a notification indicating high mineral content in the fresh water input 12, and recommending a whole-home water softener or other solution. As another example, the user device 108 may receive a notification indicating that, based on their historic and/or configured usage patterns, if they can wash a load of laundry at 9 p.m. instead of at 7 p.m., the entire water usage for that wash will come from re-used water that will be available at that time, instead of from the fresh water input 12.

Figure 3:
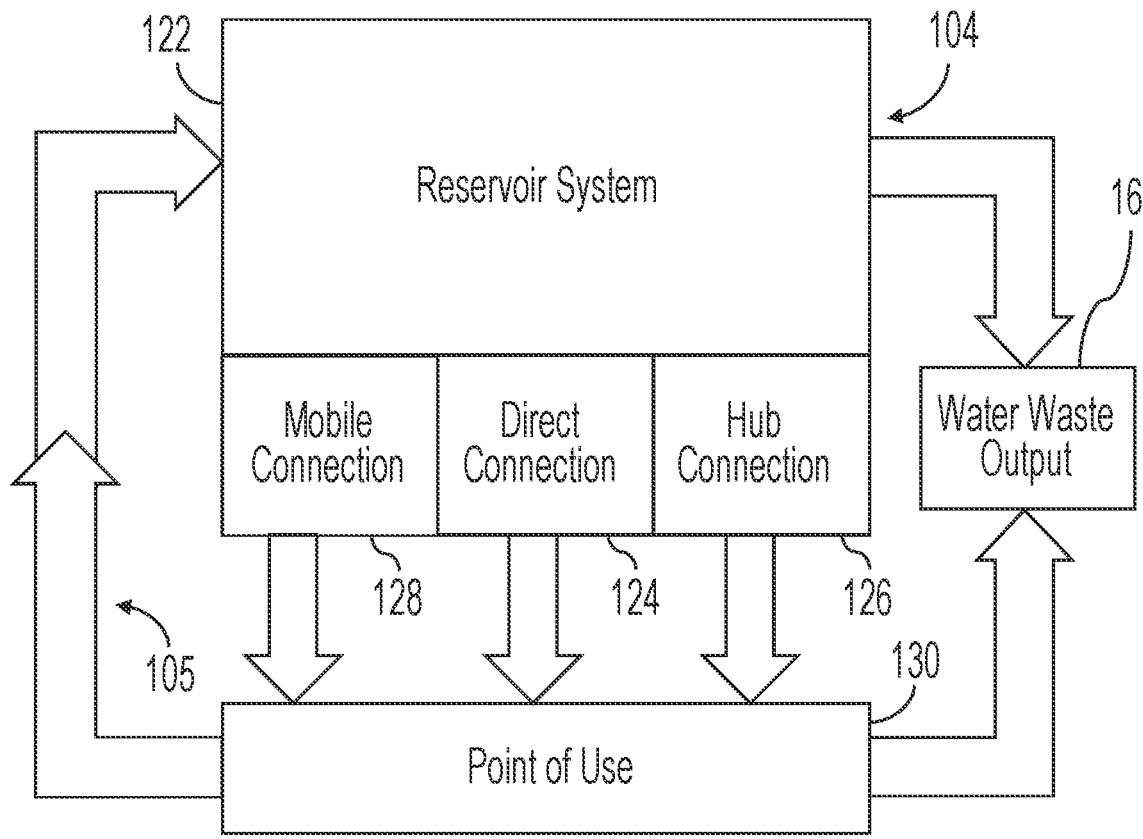
FIG. 3 is a schematic diagram of an exemplary reservoir system usable with the system of FIG. 2.
Figure 4:
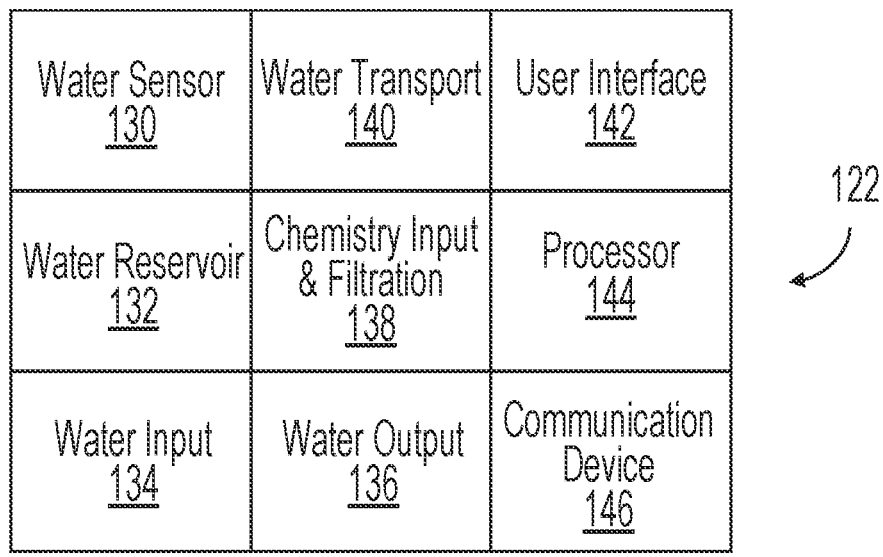
FIG. 4 is a schematic diagram showing exemplary components of the reservoir system of FIG. 3.

There has been some discussion of water storage within the water storage network 104, FIGS. 3 and 4 provide examples of a reservoir system 122 such as might be used to transport, store, treat, and provide water. While the reservoir system 122 shown in the figures includes features such as sensing systems and electronically operated pumps and/or valves, it should be understood that variations on the reservoir system 122 may instead use purely passive and/or mechanical features to accomplish the same or a similar outcome. As an example, while some reservoir systems may use an electronic pump to transport water from a point of use to the device, others may rely upon mechanical valves and systems that utilize aspects of gravity, water pressure, and/or fluid dynamics to transport water. As another example, while some reservoir systems may utilize signals generated by water sensors to determine and treat characteristics of water, other reservoir systems may instead passively treat all input water irrespective of any sensing or determination of its characteristics.

Turning now to FIG. 3, that figure shows a schematic diagram of an implementation of the reservoir system 122 within the water storage network 104. The reservoir system 122 may include a connection to a point of use 130 (e.g., any of the points of use of FIGS. 1 and 2, or others). Connection types may vary based upon a particular implementation and setting. For example, where the water storage network 104 is implemented at the time of construction, the modular infrastructure 13 may be fully or partially encapsulated within the structure. In such implementations and others, some or all of the modular infrastructure 13 may be routed through one or more hub connections 126, which may be, for example, a multi-input, multi-output valve system with electronic and/or manual valve switching capabilities. A hub connection 126 may selectively couple three or more points of use to each other and to a reservoir system 122, or multiple reservoir systems 122, to allow extremely flexible and dynamic transport of water between points of use.

As an example implementation, a hub connection 126 may couple a shower 112, sink 110, washing machine 114, and toilet 118 together and to a reservoir system 122. Water used by the shower 112 or sink 110 may be received by the reservoir system 122 and analyzed using sensors or other means. If the water may be treated for subsequent use with the washing machine 114, it will be treated and the valves of the hub connection 126 will be switched to divert that post treatment water to the washing machine 114 (e.g., or to a reservoir of some sort proximate to the washing machine 114). If the water cannot be treated for subsequent use with the washing machine 114 (e.g., such as where a person washes an oil based paint or other chemical from their hands in the sink 110), the valves of the hub connection 126 may be switched to divert that water instead to the toilet 118, or to the waste water output 16 if it cannot be treated for use with the toilet 118. The hub connection 126 may be coupled to various points of use 130 via two channels (e.g., a channel for water flowing to, and a separate channel for water flowing from), or may be coupled to various points of use 130 via a single bi-directional channel (e.g., a single channel used for input water to, and output water from, the point of use, based upon selective valve control of the hub connection 126).

In scenarios where the water storage network 104 is implemented post construction and cannot be easily encapsulated within the structure, an implementation may instead include one or more direct connections 124 that couple a single reservoir system 122 to one or more points of use 130. In such a scenario, modular infrastructure 13 may largely run along the surfaces of walls and/or floors, using low profile tubing and/or covered conduit connections. As an example of such an implementation, a reservoir system 122 may be positioned within a bathroom (e.g., mounted on a wall, placed in a corner or against a wall), and may be directly connected to the shower 112, the sink 110, and the toilet 118. The reservoir system 122 itself might have selectively controlled valves to allow it to receive water used at the shower 112 or the sink 110, and divert water to the toilet 118. In such implementations, the reservoir system 122 will typically have a dedicated operation for a single room, or within a small proximity, and will typically not support complex valve systems allowing for bi-directional flow to and from many (e.g., five or more, four or more) points of use.

A reservoir system 122 may also be coupled to a point of use 130 via a mobile connection 128 that involves physical transport of the entire reservoir system 122, or of a storage reservoir portion of the reservoir system 122. As an example, this may include physically moving (e.g., carrying, or pushing) the reservoir system 122 from a restroom to a laundry room, with the reservoir system 122 coupling to statically positioned connectors at either location. In one example, the reservoir system 122 may be coupled to a washing machine 114 in a laundry room and may receive, treat, and store water output from the washing machine 114. When the reservoir is near full (e.g., varying by volume of water storage, between around 5 and around 25 gallons as one example) a user may disconnect the reservoir system 122 and wheel it into the bathroom where it may be connected to a statically positioned coupling so that it can supply water to the toilet 118. In some implementations of the above, the reservoir system 122 itself may remain statically positioned, and instead a water cartridge portion may be removed from the reservoir system 122 and transported between points of use 130.

Regardless of the type of connection, water provided to the points of use 130 may be captured and diverted 105 back to the same or a different reservoir system 122, or, depending upon the type of point of use 130 (e.g., such as the toilet 118), it may be directed to the water waste output 16. In some implementations, the reservoir system 122 itself may also be coupled to the water waste output, either directly or via a connected point of use 130, to allow for disposal of water directly from the reservoir system 122. As such as an example, the reservoir system 122 may be coupled to the shower 112 to receive water used at the shower 112 (e.g., captured at or before the drain, as will be described in more detail below). The transport channel that allows water to be captured from the shower 112 may be used bi-directionally to dispose of water, from the reservoir system, to the water waste output 16, such as may be needed when the water is contaminated or otherwise unsuitable and untreatable for any subsequent use other than disposal.

FIG. 4 is a schematic diagram showing exemplary components of the reservoir system 122, such as may be found in one implementation. Varying implementations of the reservoir system 122 may have more or less components and features than those shown in FIG. 4, with such variations being apparent to those of ordinary skill in the art in light of this disclosure. The shown reservoir system 122 includes one or more water inputs 134, which may be a set of one or more channels and/or valves that are coupled to one or more points of use 130, and usable to capture water from those points of use 130 at or prior to the point where it drains into the primary infrastructure 11 channels leading to the water waste output 16, as depicted in FIG. 1. A water transport device 140 is directly or indirectly coupled to the water input 134, and is operable to transport water from the points of use 130 to the reservoir system 122. The water transport device 140 may be, for example, an electrical or mechanical pump that is usable to create a negative pressure into which the captured water will flow against gravity or other forces. Operation of the water transport causes captured water to flow from the point of use 130, via the water input 134, and to one or more water reservoirs 132 of the reservoir system 122.

The water reservoir 132 may be a container of varying size and shape, and is usable to store the water so that it can be treated and prepared for a subsequent use at another point of use 130. In some implementations, the reservoir system may have multiple water reservoirs 132, with water from different water inputs 134 being directed to different reservoirs 132 (e.g., dedicated reservoirs for each of the sink 110 and the shower 112), or water received at different times to be directed to different reservoirs (e.g., water from a first shower is stored in a first reservoir, water from a subsequent shower is stored in a second reservoir). This allows for variable treatment of different water transactions (e.g., a first shower may have a different chemical content, and require different treatment than a second shower), and variable disposal of water that cannot be treated (e.g., water from a second use does not intermingle with water from a first use, and so may be disposed of without impacting the water of the first use which may already be undergoing or complete with treatment). Some implementations with multiple water reservoirs 132 may include a sample and analysis reservoir where small quantities of water from a larger volume are received and sampled, a pre-treatment reservoir where untreated water is stored, or a treatment reservoir where water is analyzed and treated, a post-treatment reservoir where subsequent use water that is ready to be used is stored, for example.

Some or all of the water reservoirs 132 may include one or more water sensors 130 capable of determining characteristics of stored water, and chemistry input and filtration systems 138 capable of filtering out contaminants and/or injecting various chemical treatments into the stored water. The water sensors 130 may be in physical or optical contact with the contents of the water reservoir 132, and may include sensors capable of determining, for example, temperature, mineral content, pH, conductivity, dissolved oxygen, chemical oxygen demand, biological oxygen demand, suspended solids, dissolved solids, turbidity, presence of pathogens, pathogenic levels, pathogenic species, fecal coliforms, presence of blood, human biomarkers, ammonia, residual chlorine, bromine, phosphorus, nitrogen, boron, detection, turbidity, and the presence of dyes and or fluorescent markers at a particular wavelength. The chemistry input and filtration 138 modules may be configured to selectively or passively filter the water within the water reservoir 132 (e.g., filter water in-line as it arrives, or circulate and filter water post arrival during treatment), and may also be configured to selectively or passively inject and mix chemical into the water within the water reservoir 132 (e.g., chemicals may be injected based upon sensor 130 feedback, or may be injected based upon a received volume and/or passage of time). Examples of filtration performed may include screens or meshes or membranes of various sizes selected to capture particulate, fabrics or polymer structures to capture dissolved materials, ultra-filtration, nano filtration, reverse osmosis, forward osmosis, or by means of gravitational sedimentation, hydrodynamic separation, centrifugation, electrocoagulation, coagulation, flocculation, air filtration (aeration). Examples of chemical treatments that may be provided to the water may improve health and sanitation, such as anti-organism treatments (e.g., ultraviolet radiation, halogenation, oxidation, ozonation, acidity control, biocidal chemistries, anti-fungal chemistries and anti-viral chemistries), but may also include chemical treatments to improve water quality (e.g., reduce mineral concentration), or even to improve the experience of use (e.g., addition of color, scents, carbonation, or other aspects). Other examples, and more detailed examples of the above, include surfactants, optical agents, dyes, fluorescent markers, buffers, pH modifiers, perfumes, de-scaling agents, metal sequestration agents, polymers, colors, surface tension modifiers, viscosity modifiers, lubrication agents, silicones, emmoliation agents, conditioning agents, deodorization agents, bleaches including halogens and peroxygen compounds, biocidal agents, anti-fungal agents, anti-viral agents, enzymes, preservation agents, specific active species for deposition onto substrates, active species for specific end uses and cleaning compositions containing one or more of the preceding list. In some implementations, the chemistry input and filtration module may be configured to perform other physical or chemical changes upon stored water, such as cooling the water, heating the water, or distilling the water, and so may include components such as heating coils, solid state heating and/or cooling devices, or other temperature control or exchange devices.

The reservoir system also includes a water output 136, which may include one or more channels and/or valves usable to provide water from the water reservoir 132 to a point of use. As an example, the water output 136 may include a valve and low profile surface mounted tube connecting the reservoir system 122 to the toilet 18, so that water stored in the water reservoir 132 may be selectively provided to fill and flush the toilet 18. The water output 136 may be pressurized (e.g., by gravity, by operation of the water transport 140, or other means) to aid in transport of water to the subsequent point of use. In some implementations, the water output 136 may be coupled to the fresh water input 12 (FIG. 1), either at the reservoir system 122 or at the point of use 130, to allow for selective flow of water from the water reservoir 132, water from the fresh water input 12, or a mixture.

The reservoir system 122 may also include a processor 144 and memory, a user interface 142, and a communication device 146. The processor 144 may include one or more processors capable of receiving and transmitting electrical signals in order to execute software instructions and interact with other components of the reservoir system 122 (e.g., such as to receive information from the water sensors 130, or to operate the water transport 140). The communication device 146 may include one or more transmitters, receivers, or transceivers, such as a Bluetooth transceiver, Wi-Fi transceiver, RFID receiver or transmitter, or bi-directional USB or Ethernet connection. The communication device 146 may be operable by the processor 144 to send and receive data to and from other devices, a discussed in the context of FIG. 2 and elsewhere. The processor 144 may include one or more processors within the reservoir system, or spread across multiple devices and in communication with each other via the communication device 146 (e.g., some processing may occur on a processor of the reservoir system 122, while other processing may occur on the server 106 or another device on behalf of the reservoir system 122). The user interface 142 may include one or more of a display, an audio device, a set of indicator lights, a set of buttons, a touchscreen display, or other features. The processor 144 may be configured to operate the user interface 142 to provide information to a user (e.g., an LED display that provides a graphical user interface that shows system status, an indicator light that shows whether the water reservoir 132 is full, an audio device that beeps to provide a notification) and receive information from a user (e.g., receiving a button press or a touchscreen input to cancel an alarm, manually initiate a chemical treatment, or manually dispose of water stored in the water reservoir 132).

In addition to the above, the processor(s) 144 may also operate the water transport device 140 to capture, provide, or dispose of water, may operate valves of the water input 134 and water output 136, may operate and receive signals from the water sensor 130, and may operate the chemistry input and filtration 138 modules to provide chemical treatments based upon information from the water sensors 130 or otherwise.

Figure 5:
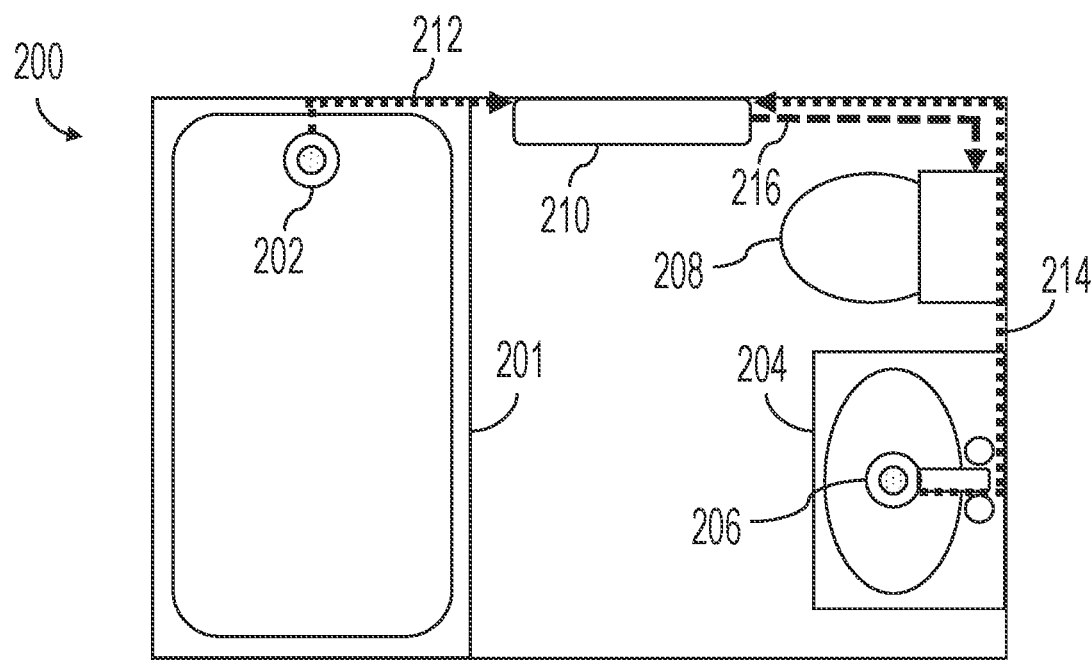
FIG. 5 is a schematic diagram showing an exemplary installation of an example reservoir system.

FIG. 5 is a schematic diagram showing an exemplary installation 200 of an example reservoir system in a conventional household bathroom. While different installations will vary greatly depending upon the size, shape, and features of a particular room, the installation 200 illustrates one example that is both effective and simple. A tub 201 is a point of use that accounts for a significant amount of water use in many homes. A toilet 208 and a sink 204 are each located in the same room as the tub 201. A reservoir system 210 (e.g., having some or all of the features of the reservoir system 122) is installed against the wall within the room, and is shaped as a vertical panel (e.g., having dimensions such as a width between about 12 and about 36 inches, a height between about 12 and about 48 inches, and a depth between about 3 and about 15 inches). However, it should be noted that reservoir systems 122 may have varying shapes or configurations other than a wall-panel, such as an expandable bladder, for example. and may be cylindrical, cubicle, cuboidal, or otherwise, depending upon the capabilities and application. The tub 201 and the sink 204 each have a drain that, absent intervention, will divert water used at that point to the water waste output 16 (FIG. 1).

In the exemplary installation depicted in FIG. 5, the tub drain is fitted with a drain insert 202 that fits within or covers the drain, and which is operable (e.g., by operation of the water transport 140) to divert used water to the reservoir system 210 via a surface mount channel 212, illustrated as a dotted line, that runs from the tub 201 drain, up the sidewall of the tub, and then along the wall of the room to couple with the reservoir system. The sink 204 is similarly fitted with a drain insert 206, with a surface mount channel 214, illustrated as dotted line, that runs from the sink 204 drain, up the sidewall, and then along the wall of the room to couple with the reservoir system 210. An output channel 216, illustrated as a dashed line, runs along the wall of the room to the toilet 208, and then connects to (e.g., replacing, or in line with) the toilets 208 standard water supply line. The channels 212, 214, 216 may be, for example, flexible tubing, flattened low profile tubing or piping (e.g., having an oval or half oval cross sectional shape), or other fluid channel, and may be adhered to the proximate surface along which they run, or encased within a protective or aesthetic cover, casing, or conduit.

In operation, using some or all of the features and techniques disclosed herein, water used at the tub 201 or sink 204 will be captured and diverted to the reservoir system 210, avoiding the primary infrastructure 11 and disposal via the waste water output 16 entirely, and instead being diverted into the modular infrastructure 13 and the reservoir system 210. After treatment and/or storage, when the toilet 208 is flushed and/or filled, the reservoir system 210 supplies water from its water reservoir 232 (FIG. 6) so that the toilet usage is supplied from re-use water instead of the fresh water input 12.

Figure 6:
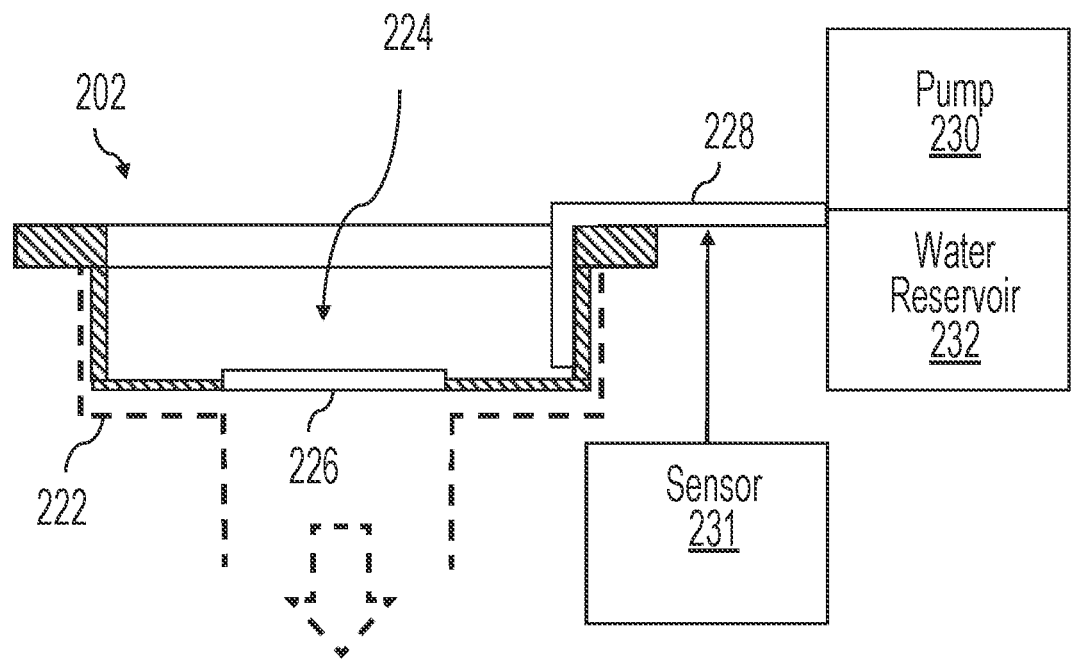
FIG. 6 depicts a side cross sectional view of an exemplary drain ring installed within a drain.

FIG. 6 depicts a side cross sectional view of the drain insert 202 installed within the tub 201. The drain insert 202 fits within a pre-existing drain 222, illustrated as dashed lines, and may include a rubber, foam, or plastic seal, gasket, or other surround to achieve a substantially water tight seal between the drain insert 202 and the pre-existing drain 222. A basin 224 of the drain insert 202 receives water used at the tub 201. A channel 228 has a proximal opening within the basin 224, while a distal connection is in fluid connection with a pump 230 and a water reservoir 232 of the reservoir system 210. A sensor 231 may be positioned within or on the channel 228, near the proximal opening, and is configured to sense the presence of water within the basin 224 and activate the pump 230 to divert the water to the water reservoir 232. In some implementations, a mechanical level switch or other alternative may be used instead of the sensor 231. A drain 226 is positioned within the bottom of the basin 224, and may be operated to prevent or allow water within the basin 224 to exit into the pre-existing drain 222. The drain 226 may be operated manually (e.g., sliding, pulling, or turning to create an opening) or may be electronically operated based upon the status of the reservoir system 210 (e.g., when the reservoir system 210 has no room for additional water storage, a signal may be transmitted via an electrical cable that runs with the channel 228 to cause the drain 226 to electronically actuate from a closed position to an open position).

Figure 7:
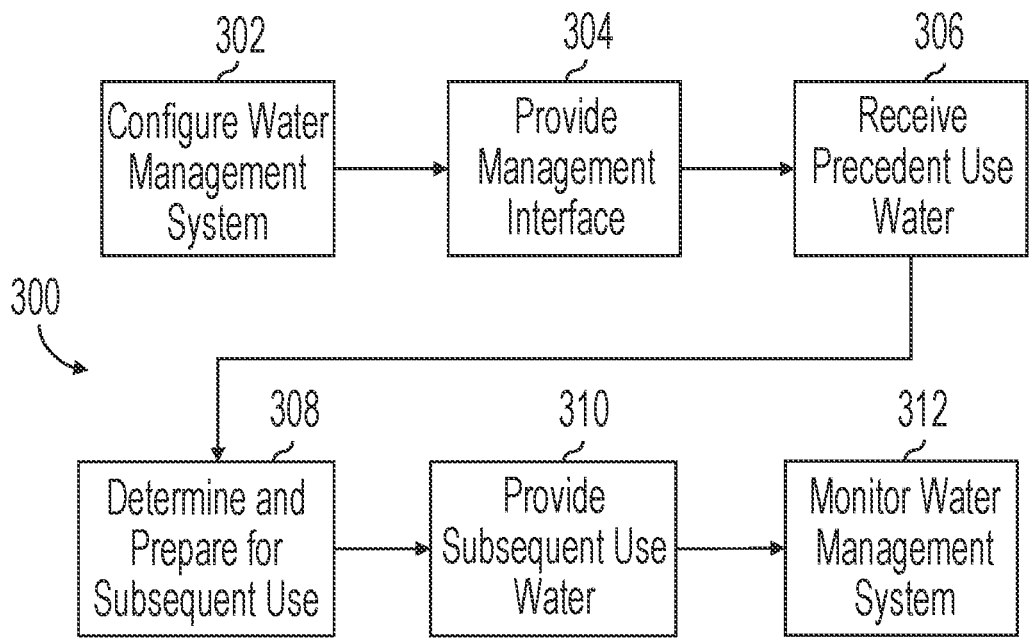
FIG. 7 is a flowchart showing an exemplary process that may be performed to provide management of water use.

While a number of features, examples, and scenarios for the disclosed system have been discussed, other examples and variations exist. As an example, FIG. 7 shows a flowchart of process 300 that may be performed to provide management of water use via a system having some or all of the features disclosed herein. The water management system may be configured 302 for use, which may include installation of some or all of the modular infrastructure 13, water storage network 104, drain inserts 202, and other devices. Configuration 302 may also include configuration of devices such as the water use hub 102, user device 108, or remote server 106 in order to provide the additional features of the system relating to capturing and reacting to data gathered from the system.

A management interface may be provided 304 to user devices 108 that are configured for use with the system, providing various ways to interact with the system. As an example, the management interface may allow a user to change system settings (e.g., enable or disable water capture across the household), view system status (e.g., water levels in various reservoir systems 122, treatment status of stored water), water usage history (e.g., amount of water used, amount of water re-used, water use by each point of use), and other interactions.

The system may receive 306 and capture precedent use water at a properly configured point of use (e.g., such as the tub 201 illustrated in FIGS. 5 and 6). Precedent use water is any water that is used and able to be captured at a point of use, whether it originates from fresh water input 12, a reservoir system 122, or another source. Subsequent use water is any water that is provided to a point of use via the modular infrastructure 13 and/or from a reservoir system, and will typically be treated for such subsequent use. Thus, imagining a single gallon of water as a discrete unit that passes through the home, when the gallon is first used (e.g., such as at a shower) it becomes a gallon of precedent use water and may be captured by the system to be converted, by treatment and/or storage, into a gallon of subsequent use water. Once the gallon of subsequent use water is provided to and used at a subsequent point of use, it then becomes a gallon of precedent use water with relation to any further capture and use by the system, or, if it is disposed of via the waste water output 16, it may simply remain a gallon of disposed subsequent use water. As has been described, receiving 306 the precedent use water may include capturing the water after its use and prior to entering the primary infrastructure 11 by means of a mechanical capture device, sensor enabled pump, or in another manner Capture of precedent use water by a particular reservoir system 122 may depend on varying factors beyond mere availability of the water (e.g., as detected by the sensor 231), such as the current capacity of water stored in the water reservoir 132, the availability or fill levels of chemical products used during treatment of the water, a manual user configuration or override, or other configurations and statuses of the reservoir system 122.

As precedent use water is received, the system may prepare the precedent use water for a subsequent use 308, which may include using sensors to determine the characteristics of the water and/or the chemical or other treatments needed to prepare for the subsequent use. Once water is treated or converted for one or more subsequent uses, with such treatment being based upon factors such as the precedent use, the water characteristics, and the intended subsequent uses, as will be described in more detail below, the water may be provided 310 for the subsequent use. Throughout the above steps and others, the system may monitor various aspects of water use 312 and automatically change configurations, or provide notifications to user devices based thereon.

Figure 8:
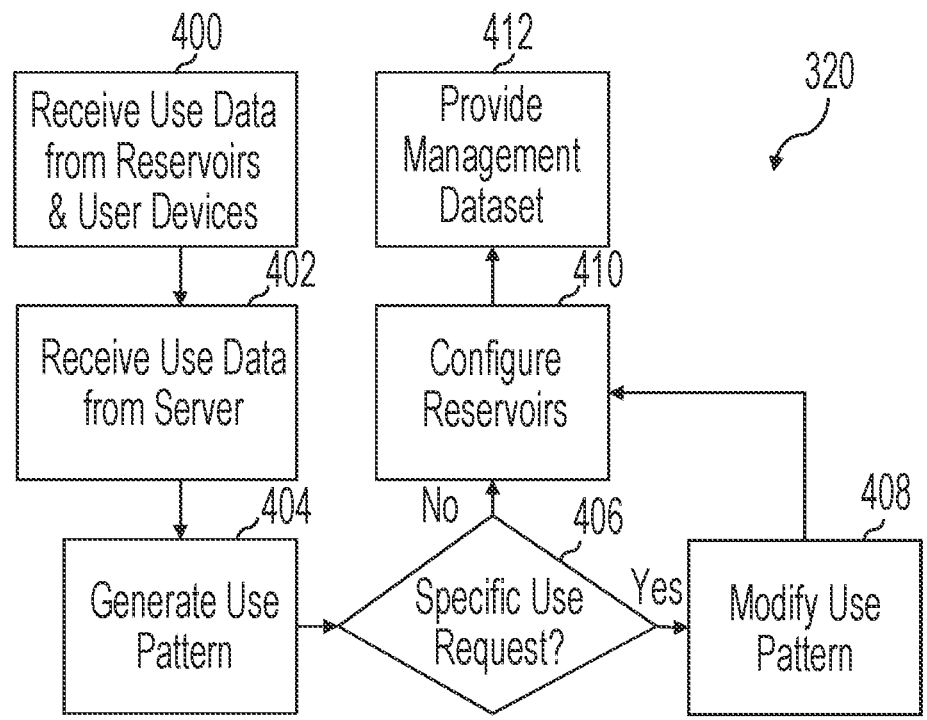
FIG. 8 is a flowchart showing an exemplary process that may be performed to configure a water use management system.

FIG. 8 is a flowchart showing an exemplary process 320 that may be performed to configure a water use management system. A component of the system (e.g., the water use hub 102) may receive 400 use data from reservoir systems 122, user devices 108, and other connected devices indicating actual water usage (e.g., volumes and times from a reservoir system 122), estimated water usage or desired water usage (e.g., information from a user device 108 indicating a user's preferred times for bathing, or washing clothing), for example. The system may also receive 402 water use data from the remote server 106, which may include local or regional factors relating to water use (e.g., cost of water service, water service peak usage times, drought conditions or other conditions that might impair water service), as well as aggregate and analytic data relating to water use, which may be created and refined over time based upon information received from a plurality of water use hubs 102, using an expert system, machine learning algorithm, or other predictive artificial intelligence system that might predict additional water use habits that cannot be determined based upon user preferences alone, for example.

Based upon the received local system information and remote information, the system may then generate 404 a water use pattern for the corresponding household or installation that identifies where and how water is used, when water can be diverted into the modular infrastructure 13, the types of treatment the water will need once diverted, and the likely locations and times of subsequent uses of the water within the system. The usage pattern may be expressed as a set of soft ranges within which the system will perform particular steps, and will prioritize efficient use and re-use of water while still allowing flexibility for users of the system. As one example, the usage pattern may be expressed as a fuzzy logic controller that identifies, based on received use data, the most likely times when water will be used and the likely volumes consumed, but then provides a fuzzy range before and after such times in which the use is less likely, but still probable. The system's actual performance may then be shifted within the fuzzy ranges to maximize efficiency of use. As an example, where it is predicted that a person is likely to use a washing machine at 7 p.m. each night, the fuzzy logic system might set a value of 1 at 7 p.m., decreasing to 0.5 at 5 p.m. and 9 p.m. However, based upon the time the user is likely to take a shower (e.g., 7 p.m.) the system might determine that the most efficient time to take a shower, while still being within the fuzzy range, is 8:30 p.m., after treatment of the precedent use water captured from the shower. The system may then operate under this assumption (e.g., capturing the precedent use shower water, and treating it for use with the washing machine), and may even provide notifications to the user devices 108 to suggest alternate, efficient times within the acceptable fuzzy range. Other examples of predictive usage patterns and system controls based thereon exist and will be apparent to those of ordinary skill in the art in light of this disclosure.

In addition to using predictive algorithms to configure the behavior of the reservoir systems 122 and other devices, the system may receive specific usage requests 406 from user devices 108. This may include where a user has the foresight to provide a hard time or hard range in which they plan to use water (e.g., a request to wash clothing at 8 p.m.). Where a specific request is received, the system may modify 408 the predictive usage pattern to give precedence to the hard range or time provided by the user. In other words, the specific request 406 that is received may overwrite the fuzzy logic range or other soft range of the usage pattern, which may cause cascading adjustments across the usage pattern. Once the use pattern is finalized, the individual reservoir systems 122 may be configured 410 with specific instructions on when to activate, when to capture water, when to provide water, when and how to treat water (e.g., chemical treatments, pre-heating for a "hot" water laundry use), and other instructions. As one or more reservoir systems 122 are configured, the system may provide 412 a management dataset to user devices 108 that describes the status and configuration of reservoir systems, and may be used to, for example, produce and render a calendar that illustrates the water usage pattern and the corresponding configurations of devices. As an example, a calendar displayed based on the management dataset might show, for one or more days of a week, the soft range for certain activities in yellow, and the efficiency maximized range in green. The management dataset may also be used by a user device 108 to generate local reminders, notifications, or suggestions, such as a locally generated alert suggesting that the user go start a load of laundry immediately, in order to either generate precedent use water, or to consume subsequent use water, for example.

Figure 9:
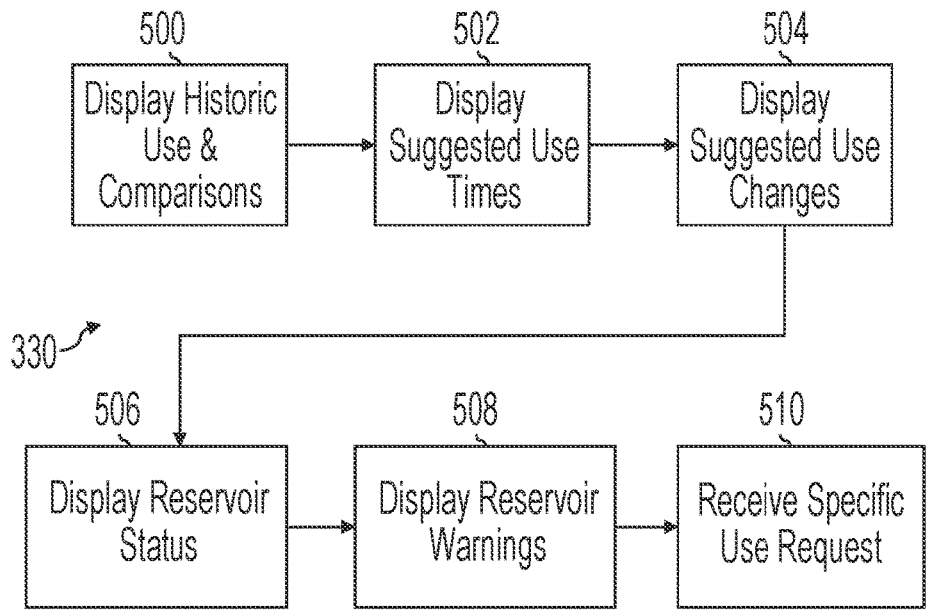
FIG. 9 is a flowchart showing an exemplary process that may be performed to provide a water use management interface.

FIG. 9 is a flowchart showing process 330 that may be performed to provide a water use management interface, such as to a user device 108, reservoir system 122, or other device. Such an interface may be provided as a graphical user interface (GUI) via a native software application, as a hybrid application, as a web application via a web browser, or through other communication interfaces. Accordingly, information received by the displaying device may include system data that is combined with a pre-existing application to render and provide the GUI, or may include both system data and code to render the GUI (e.g., such as in the example of a web application accessed via a web browser). Providing the water management GUI may include displaying 500 historic usage and comparisons for water use, such as showing daily use, monthly use, yearly use, as well as month-to-month, year-to-year, or other comparisons of the same. Water use may be expressed as a volume of water, as an actual or estimated cost in U.S. dollars or another currency, or as an arbitrary rating or score expressed numerically or visually (e.g., by color, symbol, chart, graph, or other visual expression).

The water management GUI may display 502 suggested use times, as has been described, which may include showing a daily or weekly calendar with suggested ranges or particular times of use, or automated prompts immediately before or several hours before a suggested use. Use suggestions may be based on usage patterns or other predictive measures, as described, or may be based on more immediately known and concrete status information for the system, such as suggesting a particular activity that will consume treated subsequent use water from a reservoir system 122 when it is full, or suggesting a particular activity that will provide precedent use water to the reservoir system 122 when it is empty.

The water management GUI may display suggested changes 504 in water use based on past usage data and data derived from water sensors 130. This may include providing a notification if particular water uses exceed the expected or average use by a configured threshold, such as where water used during a shower or by a washing machine substantially exceeds the expected usage. This may also include providing a notification if there is a water quality issue with the fresh water input, such as high mineral content or undesirable acidity, and such notification may include suggestions for addressing the issue, or contact information for the local water utility provider, for example. This may also include providing a notification if the captured precedent use water is determined to have an undesirable chemical content, based on data from the water sensors 130. As an example, where particular soaps, hair care products, detergents, or other chemical products that are mixed with water have an abnormal impact on the treatment of water for subsequent use (e.g., making the water impossible to treat, limiting its subsequent uses, or requiring additional treatment costs), the notification may describe that issue and suggest alternative products.

The water management GUI may display 506 a reservoir status for one or more reservoir systems, which may indicate the volume of water that they contain, whether the water is currently being treated or ready for use, the status of any filters or chemical products used by the chemistry and filtration module 138 and whether they need to be refilled or replaced, and the connectivity status of any communication devices 146, for example.

The water management GUI may display 508 reservoir warnings for one or more reservoir systems, which may indicate that an untreatable contaminant has been detected in the captured precedent use water, that a needed chemical treatment or filtration process is unavailable due to lack of chemicals or filters, or that one more points of use exhibit prolonged water use suggestive of a leak or other unintended water use, for example.

The water management GUI may also be configured to receive 510 inputs from the user device 108 indicating specific user requests or configuration changes. User requests might indicate a type of water use and time or range of time for the water use, and may cause the system to adjust any predictive or actual device configurations and schedules to accommodate the specific request, as has been previously described.

Figure 10:
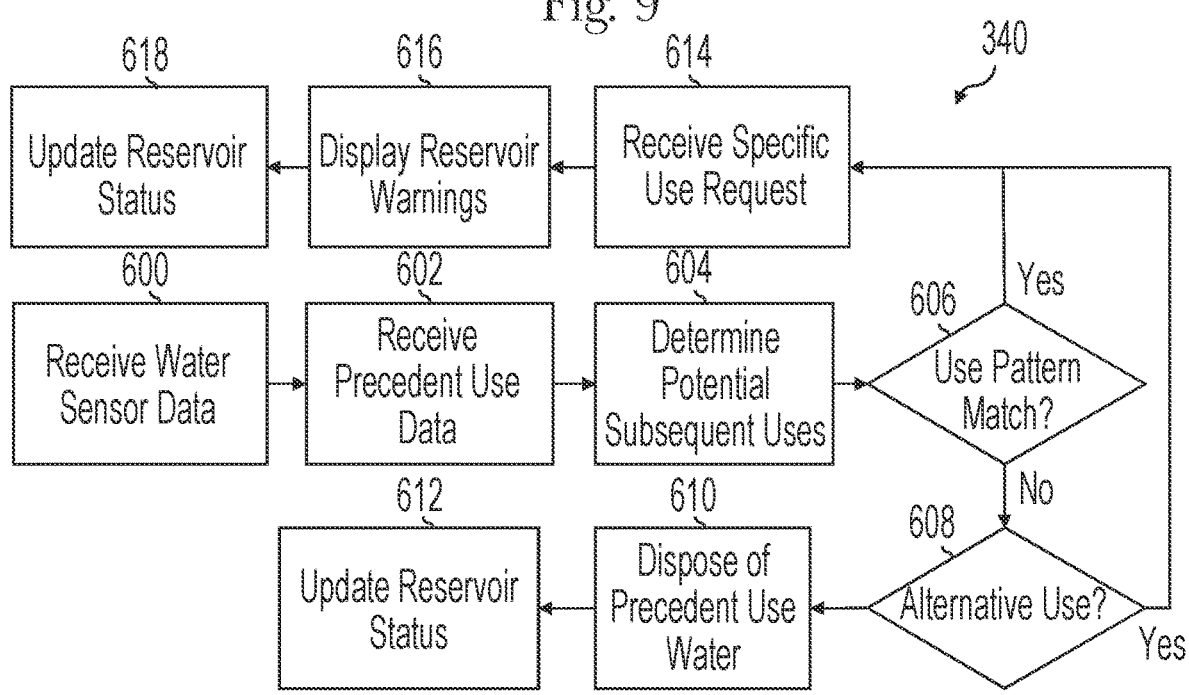
FIG. 10 is a flowchart showing an exemplary process that may be performed to prepare precedent use water for subsequent use.

FIG. 10 is a flowchart showing a process 340 that may be performed by the system (e.g., the reservoir system 122, the water use hub 102) to prepare precedent use water for subsequent use. As has been discussed, when precedent use water is available for capture, and the water reservoir 132 has capacity to receive it, the reservoir system 122 may operate to divert the precedent use water from the waste water output 16. As precedent use water is received, it may flow to one or more water reservoirs 132 for analysis, treatment, storage, or combinations thereof. When received precedent use water is available within a water reservoir 132 that includes water sensors 130, the sensors will analyze the water and the system will receive 600 a set of water sensor data describing one or more characteristics of the water (e.g., temperature, mineral content, acidity, presence of particulate). The system may also receive 602 a set of precedent use data from the user device 108 or other connected devices, or may determine the precedent use data based upon its own configurations. The precedent use data may include any data known about the precedent use of the water, such as the point of use 130 that the water arrived from (e.g., based on known configurations of the system), or the actual use of the water (e.g., based on information from a user device 108 that indicates the water was used during a shower, as well as any products that were used during the shower).

Based upon the water sensor data and any precedent use data, the system may determine 604 any potential subsequent uses for the water. This may include starting with a list of all known subsequent uses possible within the system, as well as the required or ideal water characteristics for those uses, and then narrowing the list by excluding any uses that are not possible based upon the water's known characteristics, and the treatment options available to the reservoir system 122. As a simple example, a quantity of precedent use water captured from a shower 112 may be received by a reservoir system that is capable of providing (e.g., based upon the modular infrastructure 13 and any channels or connections to other points of use, as illustrated in FIG. 3) subsequent use water to a toilet 118, outdoor faucet 116, or washing machine 114. The set of water sensor data may indicate that the precedent use water contains a chemical byproduct from the use of hair care products that can cause colored garments to fade. The set of precedent use data may confirm the use of hair care products during the precedent use, and may also list another hygiene product that produces a chemical byproduct which is harmful to plants, though its presence cannot be sensed via the water sensors 130. Based upon the known and suspected chemicals within the precedent use water, the system may determine that the precedent use water cannot be used by the washing machine 114 or the outdoor faucet 116, but that it can be treated for use by the toilet 118.

Once the potential uses are determined 604, the system may determine whether any potential uses fit within the usage patterns 606 for the system. As another example using the previously described system, where the precedent use water can be treated for use with the toilet 118 or the outdoor faucet 116, but the usage pattern for that household indicates that the outdoor faucet 116 is rarely used, then the system may exclude that possible use when determining the best fit for the precedent use water, and may instead treat the water for use with the toilet 118. Where there is no ideal use for the water based on pattern matching 606, the system may determine if there are any alternative uses that do not fit within the use pattern, but may still provide a use for the water. Referring to the example above, the system may determine that the outdoor faucet 116 use does not fit the usage pattern 606, but may also determine that the toilet 118 use is unavailable (e.g., the toilet 118 may be out of service, or may be temporarily disconnected from the modular infrastructure 13). In such a case, the outdoor faucet 116 might be identified as an acceptable alternative use 608.

Where no alternative use is available 608, such as where the water may be contaminated by biological or chemical particles that cannot be filtered, treated, or otherwise mitigated, the system may dispose 610 of the precedent use water by operating the water transport 140 to transport the water to a drain of the primary infrastructure 11 so that it may flow to the waste water output 16. As an example, with reference to FIG. 6, this may include operating the pump 230 to empty the water reservoir 232, via the channel 228, into the basin 224. This may also include providing a user device 108 a notification indicating that the drain 226 should be actuated, or may include automatically actuating the drain 226, so that the returned precedent use water may flow into the pre-existing drain 222. After disposing of the precedent use water 610, the system may update 612 the reservoir status for the affected reservoir systems 122, which may include causing the reservoir system 122 itself to indicate that it is empty, or may cause a user device 108 to display information indicating that the reservoir system is empty, and the circumstances around the disposal 610 of the precedent user water, as has been previously described in the context of FIG. 9 and elsewhere.

Where the system determines 604 one or more potential subsequent uses that fit the usage pattern 606 or fit an alternative use 608, the system will operate the chemistry input module 138 to provide the proper treatment to the precedent use water and convert it into subsequent use water having ideal characteristics for the one or more subsequent uses. Chemistry treatment 614 of the water may be performed as part of a feedback loop driven by subsequent sets of data from the water sensors 130, or may be performed independently. When chemistry treatment 614 is completed, the system may store 616 the water for the intended subsequent use, and may update 618 the reservoir status for the affected reservoir systems 122 to reflect the availability of subsequent use water. This may include displaying information indicating the volume of water that is available and the subsequent uses for which it is prepared via the reservoir system 122 itself, via a user device 108, or via another device.

Figure 11:
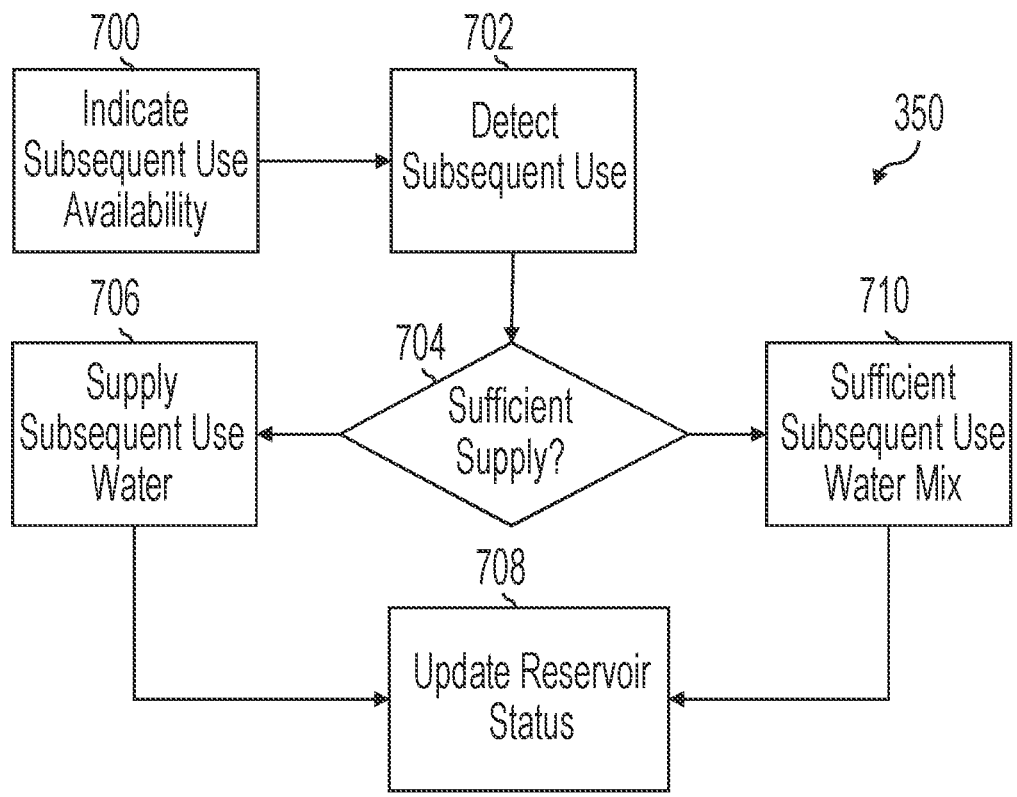
FIG. 11 is a flowchart showing an exemplary process that may be performed to provide subsequent use water.

FIG. 11 is a flowchart showing a process 350 that may be performed to provide subsequent use water from a reservoir system 122 to a point of use 130. As has been discussed, when subsequent use water is available and ready to be provided to a point of use 130 the system may indicate 700 (e.g., via the reservoir system 122 itself or a user device 108) that the subsequent use water is available. The system may detect 702 that the subsequent use water is in use, such as by a change in water flow or pressure at the water output. For example, in some implementations water flow from the water output may be under pressure, such as by operation of the water transport 140, and when a point of use begins to draw from the reservoir (e.g., after a toilet flush, as part of a washing machine cycle) the flow or pressure will change. While providing the subsequent use water to the point of use 130, the system may monitor to determine whether the flow of subsequent use water is sufficient 704, which may be determined based upon changes in water pressure. For example, where the point of use 130 is consuming more water than is being supplied, the pressure from the reservoir system 122 may be relatively low, whereas with a sufficient supply of water the pressure may be increased.

Where the water supply is sufficient, both in pressure and volume, the system may supply 706 subsequent use water to the point of use 130 as it is consumed. Where the volume or pressure is insufficient, the system may supply 710 a mixture of subsequent use water and water from the fresh water input 12. Where subsequent use water is completely exhausted, the entire volume of used water may be supplied by the fresh water input 12 via the primary infrastructure 11. As with other examples, the system may update 708 the status of any affected reservoir systems 122, which may include displaying a stored water volume, an output status, and other information via the reservoir system 122 itself or a user device 108.

Figure 13:
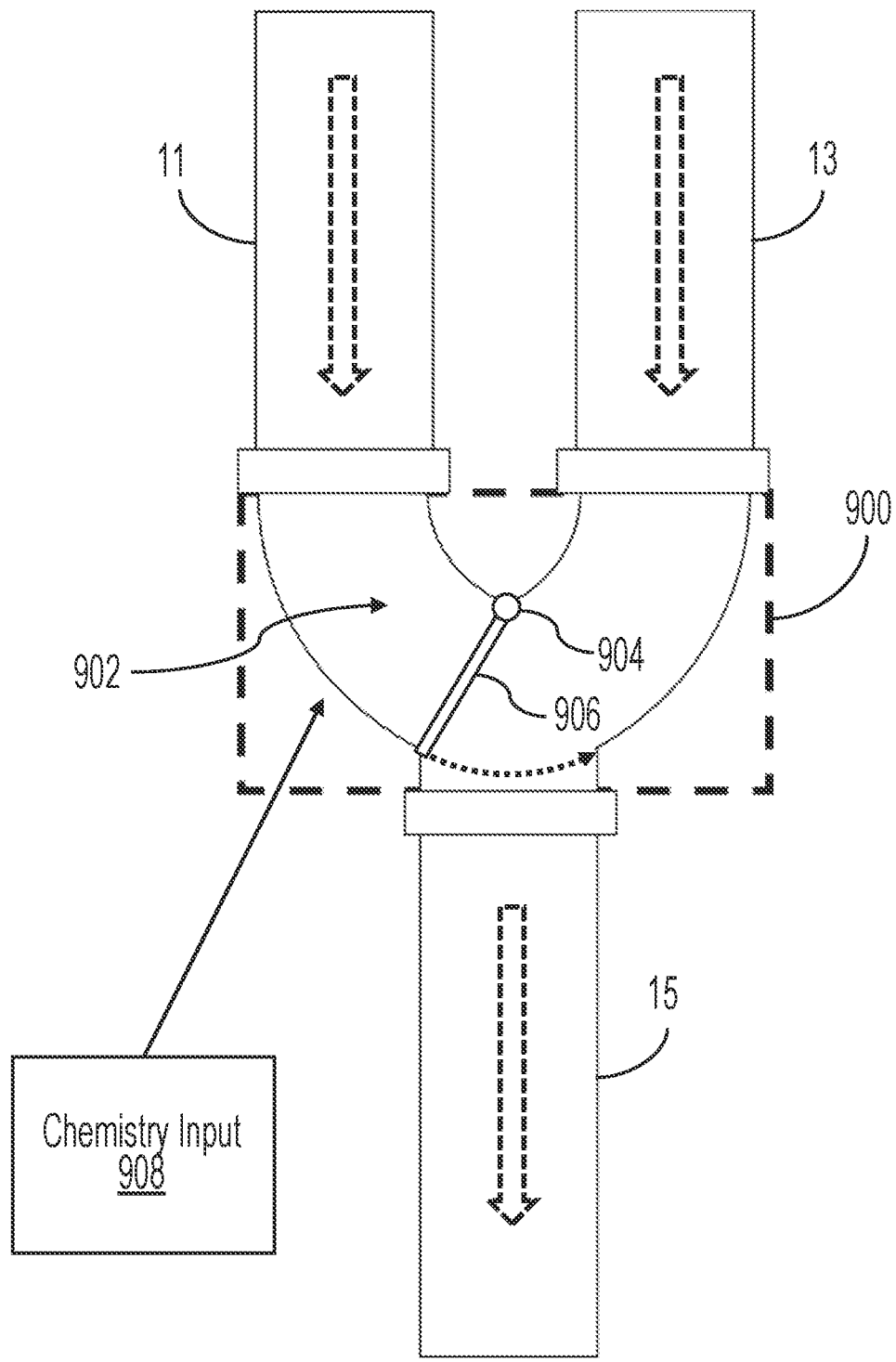
FIG. 13 is a schematic diagram of an example variable water input valve.

Mixing of fresh water and subsequent use water as described in FIG. 11 may be accomplished by a valve 900 such as that illustrated in FIG. 13. The valve 900 may couple to an input channel of the primary infrastructure 11 and an input channel of the modular infrastructure 13. Received input water (e.g., fresh water, or subsequent use water) will enter a mixing chamber 902 within the valve 900 and then flow out a shared infrastructure 15 (e.g., a water supply hose) to the point of use 130 (e.g., such as the toilet 118). The amount of water entering the mixing chamber 902 may be controlled by a seal portion 906 that is rotatable mounted at a pivot point 904 within the valve 900. The seal portion 906 may rotate at pivot point 904 within the mixing chamber 902 to provide a variably sized flow path from each input channel to the shared infrastructure 15 output channel.

In some implementations, the pivot point 904 may be a mechanical connection that biases the seal portion 906 towards the primary infrastructure 11 side of the valve 900, closing off or restricting flow from the fresh water input 12 due to a combination of the mechanical bias, as well as the volume and pressure of subsequent use water being provided to the mixing chamber. In this manner, as the flow of subsequent use water becomes insufficient, the seal portion 906 will rotate due to water pressure from the primary infrastructure 11 and begin to provide 710 a mixed flow of water to the shared infrastructure 15 channel.

In some implementations, the pivot point 904 may be an electrically actuated seal that is operated based upon electrical signals received from the reservoir system 122 or another device of the system. In one example of the above, the reservoir system 122 may monitor use 702 and supply 704 of the water, and in response to insufficient supply may adjust the position of the seal portion 906 to supply 710 the subsequent use water mix.

The valve 900 also includes a chemistry input 908 that may be an alternative or addition to the chemistry input 138 of the reservoir system. The chemistry input 908 may provide passive or active chemical treatment of water entering the mixing chamber 902 from the primary infrastructure 11, modular infrastructure 13, or both. Passive chemical treatment might include providing a static per-volume chemical input to the water based on flow volume, while active chemical treatment might include an electronically actuated injection mechanism that provides a controlled amount of chemical input in response to signals provided by the reservoir system 122 or another device.

The valve 900 may be positioned proximate to a point of use 130 (e.g., near the toilet 118) or may be integrated with the point of use 130 (e.g., the valve 900 may take the form of a shower head for the shower 112). As an example, the shower 118 may include a shower head from which water flows during use, and which includes some or all of the features of the valve 900. Fresh water may be provided to the shower head from the primary infrastructure 11, or subsequent use water may be provided to the shower from the modular infrastructure 13, or both, as described above. Chemistry input 908 for the shower head might be a passive chemical input, such as a soluble tablet that is placed within the shower head so that water flowing through the shower head contacts the soluble tablet and receives a chemical treatment such as the addition of a color, fragrance, sanitizer, or other chemical input. Chemistry input 908 for the shower head could also be actively determined by the reservoir system 122 or another device, and may be injected by an electronically actuated dispenser in response to signals received from that device. Such active treatments may be triggered by the reservoir system 122 based upon user inputs from the user device 108 (e.g., a request to add a particular fragrance to all showers, or the next shower), or based upon predicted subsequent uses. As an example, water used at the shower 112 for a precedent use, and intended to be used at the washing machine 114 for a subsequent use, may be pre-treated with a chemical input that mitigates the impact of soap, particulate, or other materials introduced by the shower 112 that are detrimental to the washing machine 114.

In some implementations of the valve 900 or other similar devices positioned proximately to, or integrated with the point of use 130, such as a shower head, the shower head may not be coupled to the modular infrastructure 13 at all, but may still include features such as the chemistry input 908. For example, a shower head such as the above may replace a pre-existing shower head, or be installed prior to or after the existing shower head within the primary infrastructure, and may provide passive and/or active chemistry input 908 as described above. The above described features (e.g., variable water input sources, chemistry input 908) may be readily adapted for use with washing machines 114 (e.g., either as a valve 900 or integrated with the washing machines existing capabilities for providing detergents), toilets 118, sinks 110, exterior faucets 116, and other points of use 130 as will be apparent to those of ordinary skill in the art in light of this disclosure.

Figure 12:
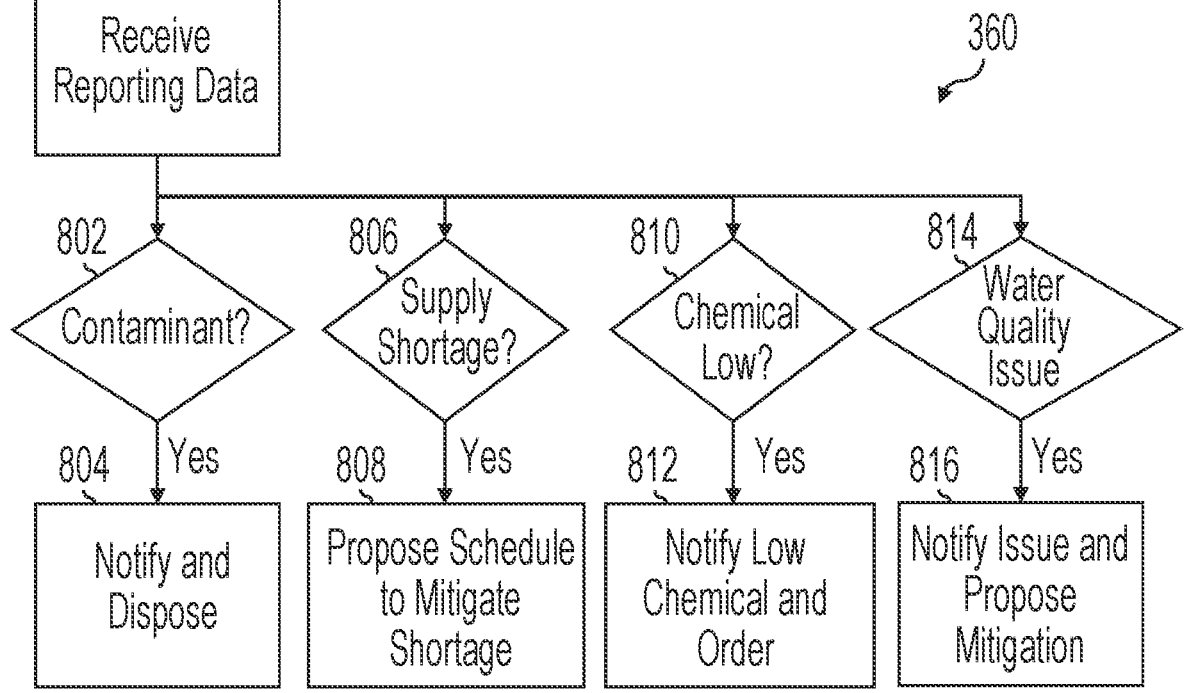
FIG. 12 is a flowchart showing an exemplary process that may be performed to provide water use monitoring.

FIG. 12 is a flowchart showing a process 360 that may be performed to provide monitoring features during use of the disclosed system. As has been described, the reservoir system 122, water use hub 102, user device 108, and other devices of the system may share and exchange data based upon the use and status of the system. Other devices within the system that may report such data include, for example, wireless flow meters connected at points of use 130, or at other points where it might be desirable to monitor water flow and use. As data is received 800 from various devices in communication with the system, the system may be configured to monitor for and automatically respond to certain situations. As an example, where data is received from a reservoir system 122 indicating the presence of an undesirable or untreatable contaminant 802, the system may automatically provide a notification to a user device 108, and dispose 804 of the contaminated water (e.g., such as by transporting it back to the point of use, as described above in the context of FIG. 6). The system may also automatically flush/clean the reservoir system after disposing 804 of the water, such as by operating a valve (e.g., such as the valve 900) to cause a backflow of water from the fresh water input 12 through the reservoir system 122.

As another example, where the system detects a supply shortage 806 of subsequent use water, the system may automatically generate and propose 808 a usage schedule to mitigate the shortage. This may be in the form of a notification to one or more user devices 108 of the system that displays a proposed schedule, and provides additional information such as the impact (e.g., in reduced water usage, reduced water costs, or both) of following the proposed schedule.

As another example, where the system detects that a certain chemical used during treatment of precedent use water is low 810, the system may automatically notify 812 a user device 108 of the shortage, and complete an electronic transaction with a third party vendor to purchase and have delivered the chemical in question.

As another example, where the system detects 814 a water quality issue (e.g., high mineral content, undesirable acidity, high chemical content), the system may automatically notify 816 the user device 108 of the quality issue. The notification may identify and describe the quality issue, and may propose actions that may be taken to mitigate the quality issue, such as the installation of water softening systems, or the use of alternate chemical products at certain points of use (e.g., an alternate soap, hair care product, or laundry detergent that will improve water quality).

Combinations

Example 1

A method comprising: (a) capturing, by a water capture device, a precedent use water prior to disposal at a precedent point of use; (b) transporting, by the water capture device, the precedent use water to a reservoir system; (c) receiving, by a processor, a set of data describing the precedent use water; (d) determining, by the processor, a set of characteristics of the precedent use water based on the set of data; (e) identifying, by the processor, a modification to the set of characteristics based on a configured set of desirable characteristics; (f) providing, by a treatment module, a chemical treatment configured to cause the modification to the set of characteristics and convert the precedent use water to subsequent use water; and (g) providing, by the reservoir system, the subsequent use water to a subsequent point of use.

Example 2

The method of example 1, further comprising, prior to the precedent use at the precedent point of use, providing, by a proximate treatment module, a precedent chemical treatment configured to cause a precedent modification to the set of characteristics.

Example 3

The method of example 2, further comprising providing the precedent chemical treatment based on the set of desirable characteristics.

Example 4

The method of example 3, wherein the precedent chemical treatment comprises one or more of surfactants, optical agents, dyes, fluorescent markers, buffers, pH modifiers, perfumes, de-scaling agents, metal sequestration agents, structural agents, polymers, colors, surface tension modifiers, viscosity modifiers, lubrication agents, silicones, emmoliation agents, conditioning agents, deodorization agents, bleaches including halogens and peroxygen compounds, preservation agents, specific active species for deposition onto substrates, active species for specific end uses and cleaning compositions containing one or more of the preceding list.

Example 5

The method of any one or more of examples 1 through 4, wherein the chemical treatment comprises one or more of surfactants, optical agents, dyes, fluorescent markers, buffers, pH modifiers, perfumes, de-scaling agents, metal sequestration agents, structural agents, polymers, colors, surface tension modifiers, viscosity modifiers, lubrication agents, silicones, emmoliation agents, conditioning agents, deodorization agents, bleaches including halogens and peroxygen compounds, preservation agents, specific active species for deposition onto substrates, active species for specific end uses and cleaning compositions containing one or more of the preceding list.

Example 6

The method of any one or more of examples 1 through 5, wherein the precedent point of use is a shower, the method further comprising providing, by a shower supplement unit, a precedent chemical treatment.

Example 7

The method of any one or more of examples 1 through 6, wherein the precedent point of use is a washing machine, the method further comprising providing, by the washing machine, a precedent chemical treatment.

Example 8

The method of any one or more of examples 1 through 7, further comprising filtering, by a filtration module of the reservoir system, the precedent use water.

Example 9

The method of any one or more of examples 1 through 8, further comprising transmitting, by a communication device of the reservoir system, at least part of the set of data to a recipient device.

Example 10

The method of example 9, further comprising transmitting, by the recipient device, at least part of the set of data to a remote server.

Example 11

The method of any one or more of examples 1 through 10, wherein the precedent use water is transported to the reservoir system via a channel encased within one or more of a wall, floor, or ceiling.

Example 12

The method of any one or more of examples 1 through 11, wherein the precedent use water is transported to the reservoir system via a surface mounted channel.

Example 13

The method of any one or more of examples 1 through 12, wherein the water capture device comprises an insert configured to fit a pre-existing drain and divert the precedent use water to the reservoir system instead of the pre-existing drain.

Example 14

The method of example 13, further comprising operating a fluid pump to divert the precedent use water to the reservoir system, wherein the fluid pump is activated by one of: (a) a mechanical switch, or (b) an electrical signal.

Example 15

The method of any one or more of examples 1 through 14, further comprising: (a) receiving, by a recipient device, water use data from one or more reservoirs including the reservoir system; (b) generating, by the recipient device, a usage pattern based on the received water use data; (c) generating, by the recipient device, a configuration change based on the usage pattern; and (d) providing, by the recipient device, the configuration change to a second recipient device, wherein the configuration change is configured to modify the operation of the second recipient device.

Example 16

The method of example 15, wherein the second recipient device is the reservoir system, and wherein the operation of the reservoir system is modified to configure the set of desirable characteristics.

Example 17

The method of any one or more of examples 15 through 16, wherein the second recipient device is a user device, and wherein the operation of the user device is modified to cause the user device to display one or more of: (a) a suggested time to use the subsequent use water at the subsequent point of use; (b) an indication that the conversion of the precedent use water to the subsequent use water is complete; or (c) an indication of the efficiency with which water is being used by a user of the user device.

Example 18

The method of any one or more of examples 15 through 17, further comprising: (a) receiving, by the recipient device, a use request indicating a desired use of the subsequent use water; and (b) modifying, by the recipient device, the usage pattern based on the use request.

Example 19

The method of example 18, wherein: (a) the use request specifies a requested point of use; and (b) the modified usage pattern is configured to cause the second recipient device to configure the set of desirable characteristics based on the requested point of use.

Example 20

The method of any one or more of examples 1 through 19, further comprising: (a) displaying, by a user device, a water management interface based on data received from one or more reservoir systems; (b) displaying, by the water management interface, the set of data; (c) displaying, by the water management interface, a suggested time to use the subsequent use water; (d) displaying, by the water management interface, a suggested change in chemical treatment associated with water use; (e) displaying, by the water management interface, a panel status that describes the availability of subsequent use water; and (f) displaying, by the water management interface, a warning associated with operation of one or more reservoir systems.

Example 21

The method of example 20, wherein the warning indicates one or more of: (a) unavailability of subsequent use water; (b) unavailability of the chemical treatment; (c) presence of a contaminant; or (d) undesirable characteristics of the subsequent use water, the precedent use water, or both.

Example 22

The method of any one or more of examples 1 through 21, further comprising: (a) determining, by the processor, a set of potential subsequent uses for the precedent use water based on the set of data and a set of chemicals available to the treatment module; (b) determining, by the processor, an ideal subsequent use based on the set of potential subsequent uses and a usage pattern that describes past water usage; and (c) determining, by the processor, the set of desirable characteristics based on the ideal subsequent use.

Example 23

The method of example 22, further comprising: (a) determining, by the processor, that no potential subsequent uses exist in the set of potential subsequent uses; and (b) in response, transporting, by the water capture device, the precedent use water to a disposal.

Example 24

The method of any one or more of examples 1 through 23, wherein the reservoir system is part of a modular infrastructure that is separate from a primary infrastructure, the method further comprising capturing the precedent use water prior to the precedent use water entering the primary infrastructure at the precedent point of use.

Example 25

The method of any one or more of examples 1 through 24, wherein the processor is a single processor within the reservoir system.

Example 26

The method of any one or more of examples 1 through 25, wherein the processor comprises a first processor within the reservoir system, and a second processor within a user device.

Example 27

The method of any one or more of examples 1 through 26, wherein the set of data includes a set of sensor data received from a water sensor module of the reservoir system.

Example 28

The method of any one or more of examples 1 through 27, wherein the set of characteristics include one or more of: (a) water temperature; (b) mineral content; (c) acidity; (d) chemical content; (e) particulate content; (1) microbial content; (g) fungal content; or (h) viral content.

Example 29

A method for managing water use using a modular infrastructure, wherein the modular infrastructure is isolated from a primary infrastructure that includes a fresh water input and a waste water output, the method comprising: (a) capturing, by a water capture device, a precedent use water prior to entering the primary infrastructure at a precedent point of use; (b) selectively transporting, by the water capture device and via the modular infrastructure, the precedent use water to a reservoir system based on a fill status of the reservoir system; (c) providing, by a treatment module, a chemical treatment configured to cause a modification to the precedent use water and convert the precedent use water to subsequent use water; and (d) providing, by the reservoir system and via the modular infrastructure, the subsequent use water to a subsequent point of use.

Example 30

The method of example 29, further comprising capturing, by the water capture device, the precedent use water prior to entering the primary infrastructure through a drain at the precedent point of use.

Example 31

A system comprising: (a) a water capture device operable to capture and transport a precedent use water from a precedent point of use prior to disposal at the precedent point of use; (b) a reservoir system configured to receive and store the precedent use water; (c) a treatment module operable to chemically treat the precedent use water in the reservoir system; (d) a processor; wherein the processor is configured to: (i) receive a set of data describing the precedent use water; (ii) determine a set of characteristics of the precedent use water based on the set of data; (iii) identify a modification to the set of characteristics based on a configured set of desirable characteristics; (iv) operate the treatment module to provide a chemical treatment configured to cause the modification to the set of characteristics and convert the precedent use water to subsequent use water; and (v) cause the reservoir system to provide the subsequent use water to a subsequent point of use.

Example 32

The system of example 31, further comprising a proximate treatment module positioned at the precedent point of use, wherein the proximate treatment module is configured to, prior to the precedent use at the precedent point of use, provide a precedent chemical treatment configured to cause a precedent modification to the set of characteristics.

Example 33

The system of example 32, wherein the proximate treatment module is further configured to provide the precedent chemical treatment based on the set of desirable characteristics.

Example 34

The system of example 33, wherein the precedent chemical treatment comprises one or more of surfactants, optical agents, dyes, fluorescent markers, buffers, pH modifiers, perfumes, de-scaling agents, metal sequestration agents, structural agents, polymers, colors, surface tension modifiers, viscosity modifiers, lubrication agents, silicones, emmoliation agents, conditioning agents, deodorization agents, bleaches including halogens and peroxygen compounds, preservation agents, specific active species for deposition onto substrates, or active species for specific end uses and cleaning compositions containing one or more of the preceding list.

Example 35

The system of any one or more of examples 31 through 34, wherein the chemical treatment comprises one or more of surfactants, optical agents, dyes, fluorescent markers, buffers, pH modifiers, perfumes, de-scaling agents, metal sequestration agents, structural agents, polymers, colors, surface tension modifiers, viscosity modifiers, lubrication agents, silicones, emmoliation agents, conditioning agents, deodorization agents, bleaches including halogens and peroxygen compounds, preservation agents, specific active species for deposition onto substrates, or active species for specific end uses and cleaning compositions containing one or more of the preceding list.

Example 36

The system of any one or more of examples 31 through 35, wherein the precedent point of use is a shower, further comprising a shower supplement unit coupled to the shower that is configured to provide a precedent chemical treatment.

Example 37

The system of any one or more of examples 31 through 36, wherein the precedent point of use is a washing machine that is configured to provide a precedent chemical treatment.

Example 38

The system of any one or more of examples 31 through 37, further comprising a filtration module configured to filter the precedent use water in the reservoir system.

Example 39

The system of any one or more of examples 31 through 38, further comprising a communication device, wherein the processor is further configured to transmit, via the communication device, at least part of the set of data to a recipient device.

Example 40

The system of example 39, wherein the recipient device is configured to transmit at least part of the set of data to a remote server.

Example 41

The system of any one or more of examples 31 through 40, further comprising a channel encased within one or more of a wall, floor, or ceiling, and coupled to the reservoir system to transport the precedent use water to the reservoir system.

Example 42

The system of any one or more of examples 31 through 41, further comprising a surface mounted channel that is coupled to the reservoir system to transport the precedent use water to the reservoir system.

Example 43

The system of any one or more of examples 31 through 42, wherein the water capture device comprises an insert configured to fit a pre-existing drain and divert the precedent use water to the reservoir system instead of the pre-existing drain.

Example 44

The system of example 43, wherein the water capture device comprises a fluid pump operable to divert the precedent use water to the reservoir system, wherein the fluid pump is activated by one of: (a) a mechanical switch, or (b) an electrical signal.

Example 45

The system of any one or more of examples 31 through 44, further comprising a recipient device, wherein the recipient device is configured to: (a) receive water use data from one or more reservoirs including the reservoir system; (b) generate a usage pattern based on the received water use data; (c) generate a configuration change based on the usage pattern; and (d) provide the configuration change to a second recipient device, wherein the configuration change is configured to modify the operation of the second recipient device.

Example 46

The system of example 45, wherein the second recipient device is the reservoir system, and wherein the operation of the reservoir system is modified to configure the set of desirable characteristics.

Example 47

The system of any one or more of examples 45 through 46, wherein the second recipient device is a user device, and wherein the operation of the user device is modified to cause the user device to display one or more of: (a) a suggested time to use the subsequent use water at the subsequent point of use; (b) an indication that the conversion of the precedent use water to the subsequent use water is complete; or (c) an indication of the efficiency with which water is being used by a user of the user device.

Example 48

The system of any one or more of examples 45 through 47, wherein the recipient device is further configured to: (a) receive a use request indicating a desired use of the subsequent use water; and (b) modify the usage pattern based on the use request.

Example 49

The system of example 48, wherein: (a) the use request specifies a requested point of use; and (b) the modified usage pattern is configured to cause the second recipient device to configure the set of desirable characteristics based on the requested point of use.

Example 50

The system of any one or more of examples 31 through 49, further comprising a user device, wherein the user device is configured to: (a) display a water management interface based on data received from one or more reservoir systems; (b) display the set of data; (c) display a suggested time to use the subsequent use water; (d) display a suggested change in chemical treatment associated with water use; (e) display a panel status that describes the availability of subsequent use water; and (f) display a warning associated with operation of one or more reservoir systems.

Example 51

The system of example 50, wherein the warning indicates one or more of: (a) unavailability of subsequent use water;

(b) unavailability of the chemical treatment; (c) presence of a contaminant; or (d) undesirable characteristics of the subsequent use water, the precedent use water, or both.

Example 52

The system of any one or more of examples 31 through 51, wherein the processor is further configured to: (a) determine a set of potential subsequent uses for the precedent use water based on the set of data and a set of chemicals available to the treatment module; (b) determine an ideal subsequent use based on the set of potential subsequent uses and a usage pattern that describes past water usage; and (c) determine the set of desirable characteristics based on the ideal subsequent use.

Example 53

The system of example 52, wherein the processor is further configured to: (a) determine that no potential subsequent uses exist in the set of potential subsequent uses; and (b) in response, operate the water capture device to transport the precedent use water to a disposal.

Example 54

The system of any one or more of examples 31 through 53, wherein the reservoir system is part of a modular infrastructure that is separate from a primary infrastructure, wherein the precedent use water is captured prior to the precedent use water entering the primary infrastructure at the precedent point of use.

Example 55

The system of any one or more of examples 31 through 54, wherein the processor is a single processor within the reservoir system.

Example 56

The system of any one or more of examples 31 through 55, wherein the processor comprises a first processor within the reservoir system, and a second processor within a user device.

Example 57

The system of any one or more of examples 31 through 56, wherein the set of data includes a set of sensor data received from a water sensor module of the reservoir system.

Example 58

The system of any one or more of examples 31 through 57, wherein the set of characteristics include one or more of: (a) water temperature; (b) mineral content; (c) acidity; (d) chemical content; (e) particulate content; (f) microbial content; (g) fungal content; or (h) viral content.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method, comprising:
    (a) capturing, by a water capture device, a precedent use water prior to disposal at a precedent point of use;
    (b) transporting, by the water capture device, the precedent use water to a reservoir system;
    (c) receiving, by a processor, a set of data describing the precedent use water;
    (d) determining, by the processor, a set of characteristics of the precedent use water based on the set of data;
    (e) identifying, by the processor, a modification to the set of characteristics based on a configured set of desirable characteristics;
    (f) providing, by a treatment module, a chemical treatment configured to cause the modification to the set of characteristics and convert the precedent use water to subsequent use water;
    (g) providing, by the reservoir system, the subsequent use water to a subsequent point of use;
    (h) receiving, by a recipient device, water use data from one or more reservoirs including the reservoir system;
    (i) generating, by the recipient device, a usage pattern based on the received water use data;
    (j) generating, by the recipient device, a configuration change based on the usage pattern; and
    (k) providing, by the recipient device, the configuration change to a second recipient device, wherein the configuration change is configured to modify the operation of the second recipient device.

2. The method of claim 1, wherein the second recipient device is the reservoir system, and wherein the operation of the reservoir system is modified to configure the set of desirable characteristics.

3. The method of claim 1, wherein the second recipient device is a user device, and wherein the operation of the user device is modified to cause the user device to display one or more of:
    (a) a suggested time to use the subsequent use water at the subsequent point of use;
    (b) an indication that the conversion of the precedent use water to the subsequent use water is complete; or
    (c) an indication of the efficiency with which water is allegedly being used by a user of the user device.

4. The method of claim 1, further comprising:
(a) receiving, by the recipient device, a use request indicating a desired use of the subsequent use water; and
(b) modifying, by the recipient device, the usage pattern based on the use request.

5. The method of claim 4, wherein:
(a) the use request specifies a requested point of use; and
(b) the modified usage pattern is configured to cause the second recipient device to configure the set of desirable characteristics based on the requested point of use.

6. A method, comprising:
(a) capturing, by a water capture device, a precedent use water prior to disposal at a precedent point of use;
(b) transporting, by the water capture device, the precedent use water to a reservoir system;
(c) receiving, by a processor, a set of data describing the precedent use water;
(d) determining, by the processor, a set of characteristics of the precedent use water based on the set of data;
(e) identifying, by the processor, a modification to the set of characteristics based on a configured set of desirable characteristics;
(f) providing, by a treatment module, a chemical treatment configured to cause the modification to the set of characteristics and convert the precedent use water to subsequent use water;
(g) providing, by the reservoir system, the subsequent use water to a subsequent point of use;
(h) displaying, by a user device, a water management interface based on data received from one or more reservoir systems;
(i) displaying, by the water management interface, the set of data;
(j) displaying, by the water management interface, a suggested time to use the subsequent use water;
(k) displaying, by the water management interface, a suggested change in chemical treatment associated with water use;
(l) displaying, by the water management interface, a panel status that describes the availability of subsequent use water; and
(m) displaying, by the water management interface, a warning associated with operation of one or more reservoir systems.

7. The method of claim 6, wherein the warning indicates one or more of:
(a) unavailability of subsequent use water;
(b) unavailability of the chemical treatment;
(c) presence of a contaminant; or
(d) undesirable characteristics of the subsequent use water, the precedent use water, or both.

8. A method, comprising:
(a) capturing, by a water capture device, a precedent use water prior to disposal at a precedent point of use;
(b) transporting, by the water capture device, the precedent use water to a reservoir system;
(c) receiving, by a processor, a set of data describing the precedent use water;
(d) determining, by the processor, a set of characteristics of the precedent use water based on the set of data;
(e) identifying, by the processor, a modification to the set of characteristics based on a configured set of desirable characteristics;
(f) providing, by a treatment module, a chemical treatment configured to cause the modification to the set of characteristics and convert the precedent use water to subsequent use water;
(g) providing, by the reservoir system, the subsequent use water to a subsequent point of use;
(h) determining, by the processor, a set of potential subsequent uses for the precedent use water based on the set of data and a set of chemicals available to the treatment module;
(i) determining, by the processor, an ideal subsequent use based on the set of potential subsequent uses and a usage pattern that describes past water usage; and
(j) determining, by the processor, the set of desirable characteristics based on the ideal subsequent use.

9. The method of claim 8, further comprising:
(a) determining, by the processor, that no potential subsequent uses exist in the set of potential subsequent uses; and
(b) in response, transporting, by the water capture device, the precedent use water to a disposal.

* * * * *